United States Patent
Kasslin et al.

(10) Patent No.: US 9,307,551 B2
(45) Date of Patent: *Apr. 5, 2016

(54) DATA-RELATED TASK SUPPORT IN WIRELESS COMMUNICATION SYSTEMS

(71) Applicant: Nokia Technologies Oy, Espoo (FI)

(72) Inventors: Mika Kasslin, Espoo (FI); Mikko Tirronen, Helsinki (FI); Kari Leppanen, Helsinki (FI); Sami Virtanen, Espoo (FI); Enrico Rantala, Iittala (FI); Markku Turunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,146

(22) Filed: Jun. 16, 2014

(65) Prior Publication Data

US 2014/0293856 A1 Oct. 2, 2014

Related U.S. Application Data

(63) Continuation of application No. 12/635,400, filed on Dec. 10, 2009, now Pat. No. 8,774,021.

(51) Int. Cl.
*H04L 12/26* (2006.01)
*H04W 72/12* (2009.01)
(Continued)

(52) U.S. Cl.
CPC ....... *H04W 72/1263* (2013.01); *H04L 12/2602* (2013.01); *H04W 48/12* (2013.01); *H04W 52/0225* (2013.01); *H04W 84/22* (2013.01)

(58) Field of Classification Search
None
See application file for complete search history.

(56) References Cited

U.S. PATENT DOCUMENTS

| 5,371,734 A | 12/1994 | Fischer |
| 6,941,372 B2 | 9/2005 | Pearson |

(Continued)

FOREIGN PATENT DOCUMENTS

| CN | 1571283 | 1/2005 |
| CN | 1728668 | 2/2006 |

(Continued)

OTHER PUBLICATIONS

Kneckt et al., "Power save for 802.11s", IEEE 802.11-08/0168r1, Jan. 2008.*

(Continued)

*Primary Examiner* — Khoa Huynh
(74) *Attorney, Agent, or Firm* — Locke Lord LLP

(57) ABSTRACT

Apparatuses may stay synchronized with a network via a beacon signal that is transmitted at a set interval. Various communication-related activities may be planned around an instance when a beacon signal is expected, or a target beacon transmission time (TBTT). While some networked apparatuses are active during every TBTT, other apparatuses may operate using a diluted beacon period that is an integer multiple of the network beacon signal interval. Diluted beacon intervals may initiate periods of time during which apparatuses may become "aware" of other apparatuses. Awareness may comprise information related to communication configuration, apparatus status, and services offered by the various apparatuses in the network. Awareness information obtained during an awake window may also comprise information on data-related tasks that are pending in one or more apparatuses which may allow for the control of further data conveyance activities.

30 Claims, 16 Drawing Sheets

(51) Int. Cl.
*H04W 48/12* (2009.01)
*H04W 52/02* (2009.01)
*H04W 84/22* (2009.01)

(56) References Cited

U.S. PATENT DOCUMENTS

| | | | |
|---|---|---|---|
| 7,567,673 B2 | 7/2009 | Fukuzawa et al. | |
| 7,590,100 B2 | 9/2009 | Smith et al. | |
| 7,774,495 B2 | 8/2010 | Pabla et al. | |
| 7,840,903 B1 | 11/2010 | Amidon et al. | |
| 7,848,277 B2 | 12/2010 | Chou et al. | |
| 7,864,720 B2 | 1/2011 | Jeyaseelan | |
| 7,907,557 B2 | 3/2011 | Carter | |
| 8,005,032 B2 | 8/2011 | Wang et al. | |
| 8,014,378 B1 | 9/2011 | Yoon et al. | |
| 8,165,106 B2 | 4/2012 | Yang et al. | |
| 2002/0101446 A1 | 8/2002 | Tang et al. | |
| 2003/0204742 A1 | 10/2003 | Gupta et al. | |
| 2004/0153676 A1 | 8/2004 | Krantz et al. | |
| 2005/0025092 A1 | 2/2005 | Morioka et al. | |
| 2005/0068928 A1 | 3/2005 | Smith et al. | |
| 2005/0128988 A1 | 6/2005 | Simpson et al. | |
| 2005/0193106 A1 | 9/2005 | Desai et al. | |
| 2006/0034217 A1 | 2/2006 | Kwon et al. | |
| 2006/0050730 A1 | 3/2006 | Shvodian | |
| 2006/0120314 A1 | 6/2006 | Krantz et al. | |
| 2006/0215588 A1 | 9/2006 | Yoon | |
| 2006/0251004 A1 | 11/2006 | Zhong et al. | |
| 2006/0285510 A1 | 12/2006 | Kim et al. | |
| 2007/0002866 A1 | 1/2007 | Belstner et al. | |
| 2007/0014269 A1* | 1/2007 | Sherman | H04W 48/12 370/338 |
| 2007/0086424 A1 | 4/2007 | Calcev et al. | |
| 2007/0086426 A1 | 4/2007 | Bonta et al. | |
| 2007/0127427 A1 | 6/2007 | Tanaka | |
| 2007/0161364 A1* | 7/2007 | Surineni | H04W 52/0225 455/343.4 |
| 2007/0226777 A1 | 9/2007 | Burton et al. | |
| 2007/0254596 A1* | 11/2007 | Corson | H04L 5/0016 455/68 |
| 2008/0025512 A1 | 1/2008 | Nakajima | |
| 2008/0031208 A1 | 2/2008 | Abhishek et al. | |
| 2008/0125190 A1 | 5/2008 | Jan et al. | |
| 2008/0130543 A1 | 6/2008 | Singh et al. | |
| 2008/0151848 A1 | 6/2008 | Fischer et al. | |
| 2008/0212525 A1 | 9/2008 | Tervonen et al. | |
| 2008/0261639 A1 | 10/2008 | Sun et al. | |
| 2008/0268892 A1 | 10/2008 | Hamdi et al. | |
| 2009/0073871 A1 | 3/2009 | Ko et al. | |
| 2009/0147702 A1 | 6/2009 | Buddhikot et al. | |
| 2009/0156190 A1 | 6/2009 | Fisher | |
| 2009/0196180 A1 | 8/2009 | Bahl et al. | |
| 2009/0247201 A1 | 10/2009 | Ye et al. | |
| 2009/0279449 A1 | 11/2009 | Kneckt et al. | |
| 2009/0303926 A1 | 12/2009 | Den Hartog et al. | |
| 2009/0310571 A1 | 12/2009 | Matischek et al. | |
| 2009/0310618 A1 | 12/2009 | Carter | |
| 2010/0002608 A1 | 1/2010 | Goldhamer | |
| 2010/0110948 A1 | 5/2010 | Batta | |
| 2010/0111066 A1 | 5/2010 | Mehta | |
| 2010/0138549 A1 | 6/2010 | Goel et al. | |
| 2010/0142463 A1 | 6/2010 | Hu | |
| 2010/0157827 A1 | 6/2010 | Park et al. | |
| 2010/0165947 A1 | 7/2010 | Taniuchi et al. | |
| 2010/0189082 A1 | 7/2010 | Choi et al. | |
| 2010/0226297 A1 | 9/2010 | Kasslin et al. | |
| 2010/0226309 A1 | 9/2010 | Kasslin et al. | |
| 2010/0246591 A1 | 9/2010 | Gobriel et al. | |
| 2010/0302947 A1 | 12/2010 | Leppanen et al. | |
| 2010/0304759 A1 | 12/2010 | Leppanen et al. | |
| 2010/0332683 A1 | 12/2010 | Das et al. | |
| 2011/0038349 A1 | 2/2011 | Sun et al. | |
| 2011/0065440 A1 | 3/2011 | Kakani | |
| 2011/0141966 A1 | 6/2011 | Kasslin et al. | |
| 2011/0142028 A1 | 6/2011 | Kasslin et al. | |
| 2011/0142029 A1 | 6/2011 | Kasslin et al. | |
| 2011/0222493 A1 | 9/2011 | Mangold et al. | |
| 2011/0250857 A1 | 10/2011 | Reial et al. | |
| 2011/0250921 A1 | 10/2011 | Reial | |
| 2012/0077506 A1 | 3/2012 | Wietfeldt et al. | |
| 2012/0225662 A1 | 9/2012 | Jo et al. | |

FOREIGN PATENT DOCUMENTS

| | | |
|---|---|---|
| CN | 101159894 | 4/2008 |
| CN | 101601229 | 12/2009 |
| EP | 1361728 | 11/2003 |
| EP | 1396986 | 3/2004 |
| EP | 1545146 | 6/2005 |
| EP | 1703701 | 9/2006 |
| EP | 2107732 | 10/2009 |
| WO | WO2004054215 | 6/2004 |
| WO | WO2004091246 | 10/2004 |
| WO | WO2005006658 | 1/2005 |
| WO | WO2008019140 | 2/2008 |
| WO | WO2008075264 | 6/2008 |
| WO | WO2008094107 | 8/2008 |
| WO | WO2009113798 | 9/2009 |
| WO | WO2009135996 | 11/2009 |
| WO | WO2010029386 | 3/2010 |

OTHER PUBLICATIONS

English Language Machine Translation of Chinese Patent Application Publication No. CN1571283, 7 pages.

English Language Machine Translation of Chinese Patent Application Publication No. CN101601229, 8 pages.

English Language Machine Translation of Chinese Patent Application Publication No. CN1728668, 12 pages.

Extended European Search Report for European Application No. 12183977.3—Date of Completion of Search: Jun. 12, 2013, 6 pages.

International Search Report for International Application No. PCT/FI2010/050069—Date of Completion of Search: Jun. 4, 2010, 4 pages.

International Search Report for International Application No. PCT/FI2010/050838—Date of Completion of Search: Jan. 21, 2011, 4 pages.

Chen, H. et al., IEEE P802.11; doc.:IEEE 802.11-10/0828r0, Wireless LANs, Normative Text for 5 MHz Measurement Pilot Frame, Jun. 2010, 4 pages.

Wang, L. et al., Proposed SFD Text for 802.11ai, doc.:IEEE 11-12-0406-02-00ai; Passive Scanning Improvement, May 4, 2012, 15 pages.

Cavalcanti, D. et al., "IEEE 802.22-07/0121r1: Proposed text changes to Section 6.21.2 Self-coexistence in IEEE 802.22/D0.2 Draft Standard" published in Mar. 2007, 26 pages.

Cordeiro, C. et al.,"Cognitive PHY and MAC Layers for Dynamic Spectrum Access and Sharing of TV Bands", published by ACM on Aug. 5, 2006, 11 pages.

International Search Report for International Application No. PCT/IB2010/052403—Date of Completion of Search: Sep. 8, 2010, 4 pages.

IEEE 802.11-2007, Wireless Medium Access Control (MAC) and Physical Layer (PHY) Specifications, Jun. 2007, Chapter 7.2.3.1 entitled: "Beacon frame format", (pp. 80-81).

International Search Report mailed Feb. 21, 2011 for International Application No. PCT/FI2010/050838, 4 pages.

Wang et al., "AwareWare: An Adaptation Middleware for Heterogeneous Environments", IEEE Communications Society, Jun. 20, 2004, International Conference in Paris, France, pp. 1406-1410.

International Search Report for International Application No. PCT/FI2010/050071—Date of Completion of Search: May 3, 2010, 4 pages.

International Search Report for International Application No. PCT/FI2010/050801—Date of Completion of Search: Feb. 3, 2011, 4 pages.

(56) References Cited

OTHER PUBLICATIONS

International Search Report for International Application No. PCT/FI2010/050803—Date of Completion of Search: Feb. 24, 2011, 4 pages.
Gao, X. et al., "Optimal ATIM size for 802.11 networks in ad hoc mode", DoCoMo Communications Lab USA, INFOCOM 2006, Apr. 27, 2006, 3 pages.
Jung, E. et al., "An Energy Efficient MAC Protocol for Wireless LANs", Technical Report TR01-017, Department of Computer Science, Texas A&M University, Jul. 31, 2001, 11 pages.
Wi-Fi Alliance Technical Committee Quality of Service (QoS) Task Group, WMM (including WMM Power Save Specification), Version 1.1, 2004, 36 pages.
English Language Machine Translation of Chinese Patent Application Publication No. CN101159894—5 pages.
Baek, S. et al., "Performance Analysis of Power Save Mode in IEEE 802.11 Infrastructure WLAN", Department of Mathematics and Telecommunication Mathematics Research Center, Korea University, Seoul, Korea, IEEE, 2008, 4 pages.
Extended European Search Report for EP App. No. 10835541.3, dated: Feb. 24, 2016, 12 pages.

\* cited by examiner

DATA-RELATED TASK SUPPORT IN WIRELESS COMMUNICATION SYSTEMS

This application is a continuation of U.S. application Ser. No. 12/635,400 filed Dec. 10, 2009, the entire contents of which are incorporated herein by reference.

BACKGROUND

1. Field of Invention

Embodiments of the present invention pertain to wireless communication, and in particular, to supporting data-related tasks in wireless communication systems.

2. Background

Wireless communication has evolved from being a means for verbal information to being more focused on total digital interactivity. Enhancements in wireless technology have substantially improved communication abilities, quality of service (QoS), speed, etc., which has contributed to an insatiable desire for new device functionality. As a result, portable wireless apparatuses are no longer just tasked with making telephone calls. They have become integral, and in some cases essential, tools for managing the professional and/or personal life of users.

In order to support the desired expansion of electronic communication, more and more applications that did not incorporate any communication functionality are being redesigned to support wired and/or wireless communication. Such wireless communication support may, in some instances, include the ability to send monitored or observed data to other apparatuses via wireless communication. Example usage scenarios may include natural resource monitoring, biometric sensors, systems for supporting financial transactions, personal communication and/or location devices, etc. Apparatuses such activities and subsequent communications often operate using limited resources. For example, these apparatuses may be simple (e.g., may have limited processing resources), may be small (e.g., may have space constraints due to size limitations imposed in retrofit applications), may have power constraints (e.g., battery powered), etc.

Link establishment and maintenance processes defined in existing communication protocols may not be appropriate for apparatuses operating with resource constraints such as set forth above. For example, standards for existing wireless communication protocols may require lengthy interaction in order to keep apparatuses participating in the network synchronized with other apparatuses, wherein such interaction may comprise either continuous or periodic network participation. These requirements may not take into consideration the burden that such extensive network communication places upon resource-constrained devices. As a result, it may become difficult to operate such resource-constrained apparatuses in accordance with these standards.

SUMMARY

Example embodiments of the present invention may be directed to a method, apparatus, computer program and system for facilitating apparatus interaction while conserving apparatus resources. In accordance with at least one example implementation, apparatuses may stay synchronized with a network via a beacon signal that is transmitted at a set interval. Various communication-related activities may be planned around an instance when a beacon signal is expected, which may also be known as a target beacon transmission time (TBTT). While some networked apparatuses may be able to be active during every TBTT, other apparatuses may find this practice too burdensome due to the resources required by such behavior. In this regard, a diluted beacon period, based on an integer multiple of the network beacon signal interval, may be established that may lessen the burden on apparatuses since communication is less frequent.

The diluted beacon interval may initiate periods of time during which apparatuses may communicate within the network. This period of time, or awake window, may initially allow apparatuses to become "aware" of the current disposition of other apparatuses. Awareness may comprise information related to communication configuration, apparatus status, and services offered by the various apparatuses in the network. Further, in accordance with at least one embodiment of the present invention, awareness information obtained during an awake window may also comprise information on data-related tasks that are pending in one or more apparatuses.

Data-related tasks may comprise, for example, information regarding data that has been published by an apparatus in order to make the data available to other apparatuses in the network. Published data may be of interest to (e.g., may be required or desired by) apparatuses in the network. Obtaining this published data may, however, require much more bandwidth than is currently available in the network. In accordance with various example implementations of the present invention, an apparatus may alter its configuration in order to perform data-related tasks such as obtaining published data from an apparatus that is publishing its availability.

Altering the configuration of an apparatus may depend on whether the current protocol being implemented supports data sub-mode operation. For example, the protocol being implemented in order to form the network over which awareness information is obtained may also support a data sub-mode operation. Data sub-mode operation may temporarily allocate communication resources to support more substantial messaging. The apparatus may continue operation in the data sub-mode until the data-related task is complete or until the time allocated for the data sub-mode is complete. This may occur, for example, just before the start of the next awake state period. In situations where a data sub-mode is not supported by a communication protocol, the apparatus may switch to an alternative communication protocol. For example, the apparatus may establish a wireless link with a new protocol in order to support data transmission.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

While the present invention has been described herein in terms of a multitude of example embodiments, various changes or alterations can be made therein without departing from the spirit and scope of the present invention, as set forth in the appended claims.

Figure 1:
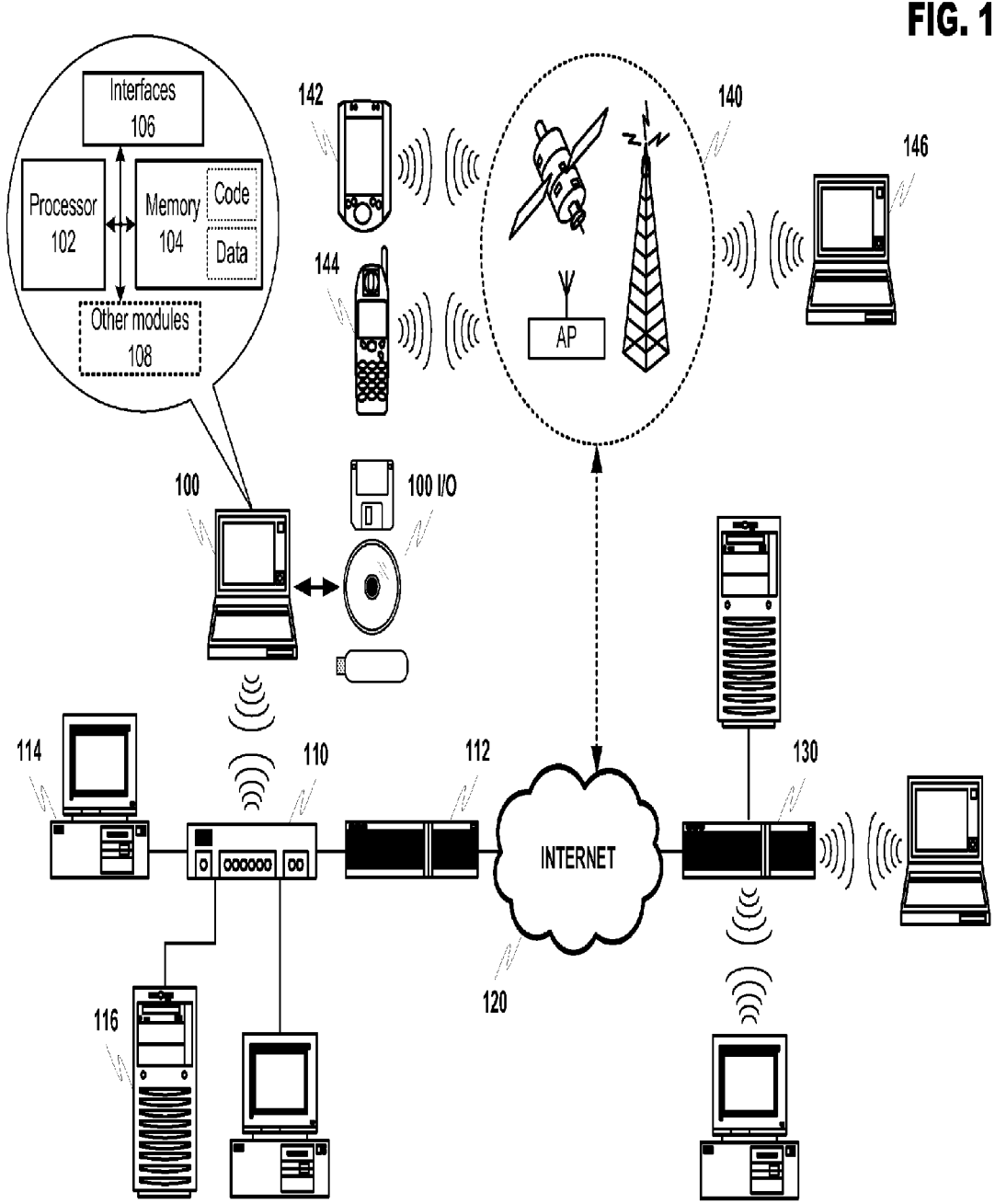
FIG. 1 discloses examples of hardware and software resources that may be utilized when implementing various example embodiments of the present invention.

I. General System with which Embodiments of the Present Invention May be Implemented An example system usable as a basis for explaining the various embodiments of the present invention is disclosed in FIG. 1. The apparatuses and configurations shown in FIG. 1 are merely representative, and thus, may be included in, or omitted from, actual implementations.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may comprise one or more components configured to execute instructions, for instance, wherein a group of instructions may constitute program code. In at least one scenario, the execution of program code may include receiving input information from other elements in computing device 100 in order to formulate an output (e.g., data, event, activity, etc.). Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired and/or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks also shown in FIG. 1. For example, communication hub 110 may provide wired and/or wireless support to devices such as computer 114 and server 116. Communication hub 110 may also be coupled to router 112, allowing devices in the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may interact with computing device 100 over Internet 120 as facilitated by wireless communication 140. Similar functionality may be also be included in other apparatuses, such as laptop computer 146, in the form of hardware and/or software resources configured to allow short and/or long range wireless communication.

II. Example Networking Environment

Figure 2:
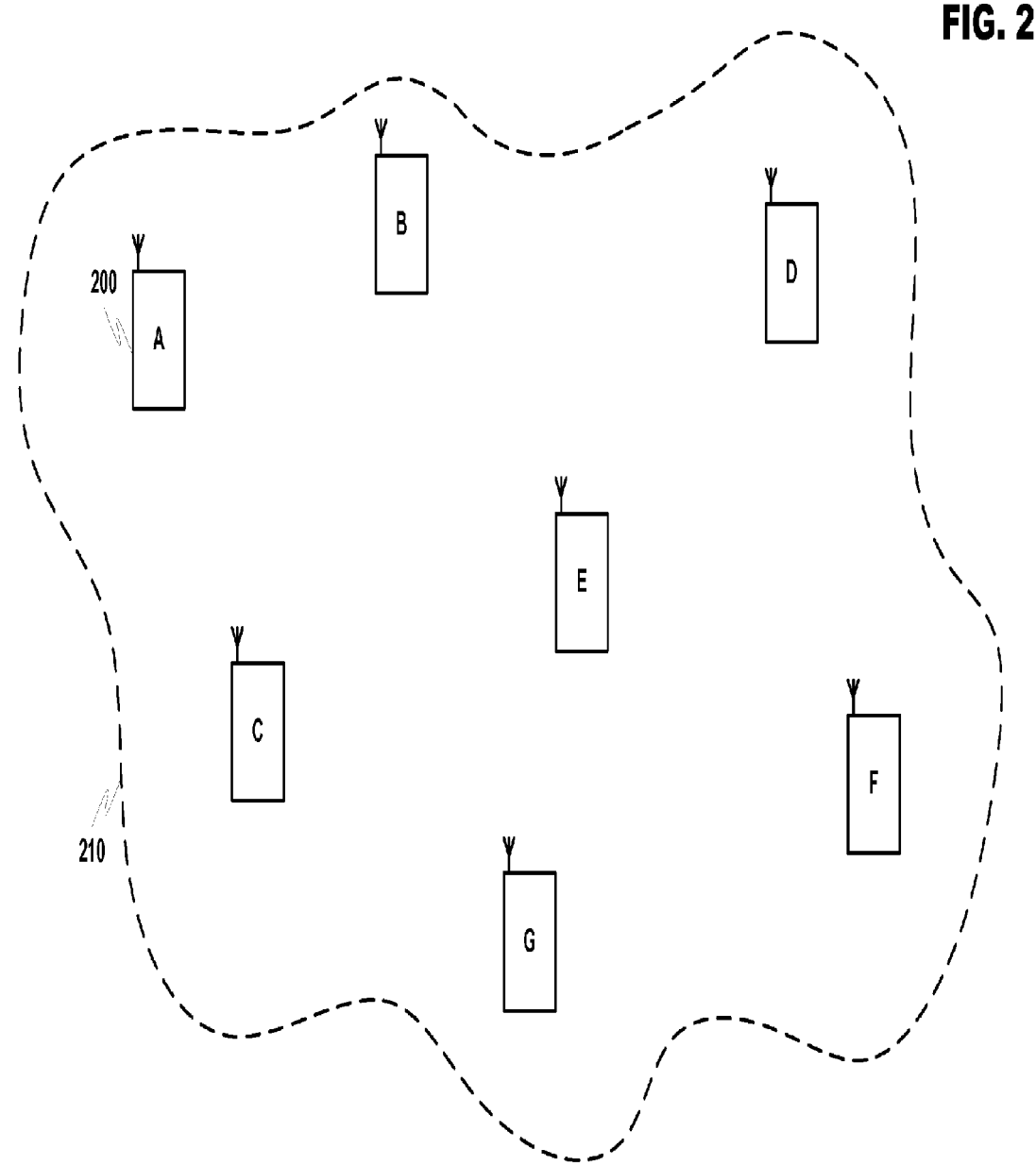
FIG. 2 discloses an example network environment in accordance with at least one example embodiment of the present invention.

FIG. 2 discloses an example of an operational space that will be used to explain the various example embodiments of the present invention. As this example scenario is utilized herein only for the sake of explanation, implementations of the present invention are not limited specifically to the disclosed example. Operational spaces may be defined using different criteria. For example, physical areas like buildings, theatres, sports arenas, etc. may define a space where users may interact. Alternatively, operational spaces may be defined in terms of apparatuses that utilize particular wireless transports, apparatuses that are within communication range (e.g., a certain distance) of each other, apparatuses that are members of certain classes or groups, etc.

Wireless-enabled apparatuses 200 are labeled "A" to "G" in FIG. 2. Apparatuses 200 may, for example, correspond to any of the wireless-enabled apparatuses that were disclosed in FIG. 1, and may further include at least the resources discussed with respect to apparatus 100. These apparatuses may further operate utilizing at least one common wireless communication protocol. That is, all of the apparatuses disclosed in FIG. 2 may interact with each other within the operational space, and thus, may participate together in a wireless communication network.

III. Examples of Messaging

Figure 3:
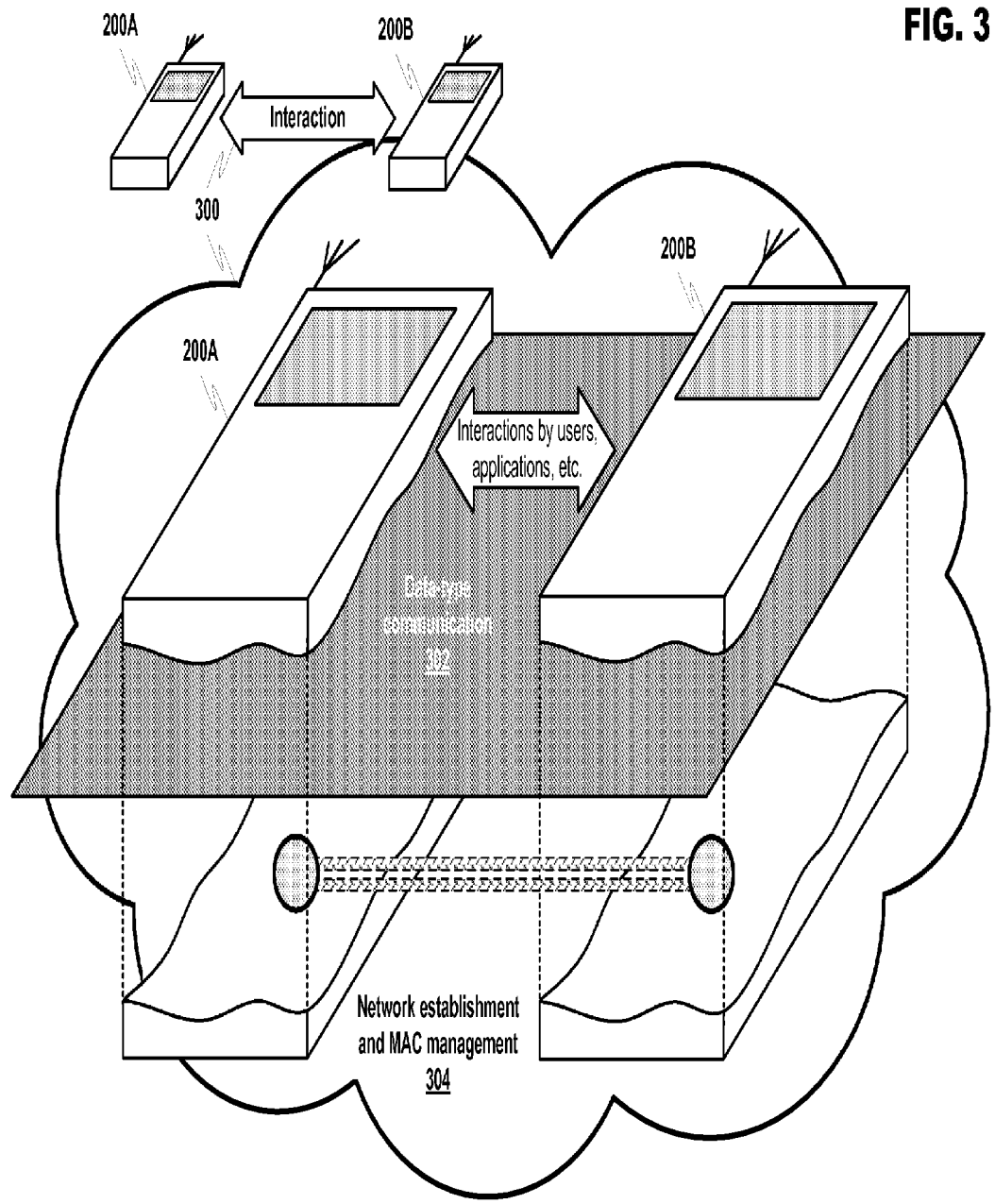
FIG. 3 discloses examples of various types of messaging that may be utilized in accordance with at least one example embodiment of the present invention.

An example communication between apparatuses in accordance with at least one embodiment of the present invention is disclosed at 300 in FIG. 3. While only two apparatuses 200A and 200B are shown, the example disclosed in FIG. 3 has been presented for explanation only, and is not intended to limit the scope of the present invention. Various embodiments of the present invention may readily facilitate wireless interaction between more than two apparatuses.

Additional detail with respect to communication example 300 is disclosed further in FIG. 3. Apparatus 200A may have communication requirements that require interaction with apparatus 200B. For example, these requirements may comprise interactions by apparatus users, applications residing on the apparatuses, etc. that trigger the transmission of messages that may be generally classified under the category of data-type communication 302. Data-type communication may be carried out using messages that may be wirelessly transmitted between apparatus 200A and 200B. However, typically some form of wireless network link or connection needs to be established before any data type communication messages 302 may be exchanged.

Network establishment and media access control (MAC) management messages 304 may be utilized to establish and maintain an underlying wireless network architecture within an operating space that may be utilized to convey data type communication messages 302. In accordance with various example embodiments of the present invention, messages containing apparatus configuration, operation and status information may be exchanged to transparently establish wireless network connections when, for example, an apparatus enters an operating space. Network connections may exist between any or all apparatuses existing within the operating space, and may be in existence for the entire time that an apparatus resides in the operating space. In this way, data-type communication messages 302 may be conveyed between apparatuses using existing networks (new network connections do not need to be negotiated each time messages are sent), which may reduce response delay and increase quality of service (QoS).

Figure 4:
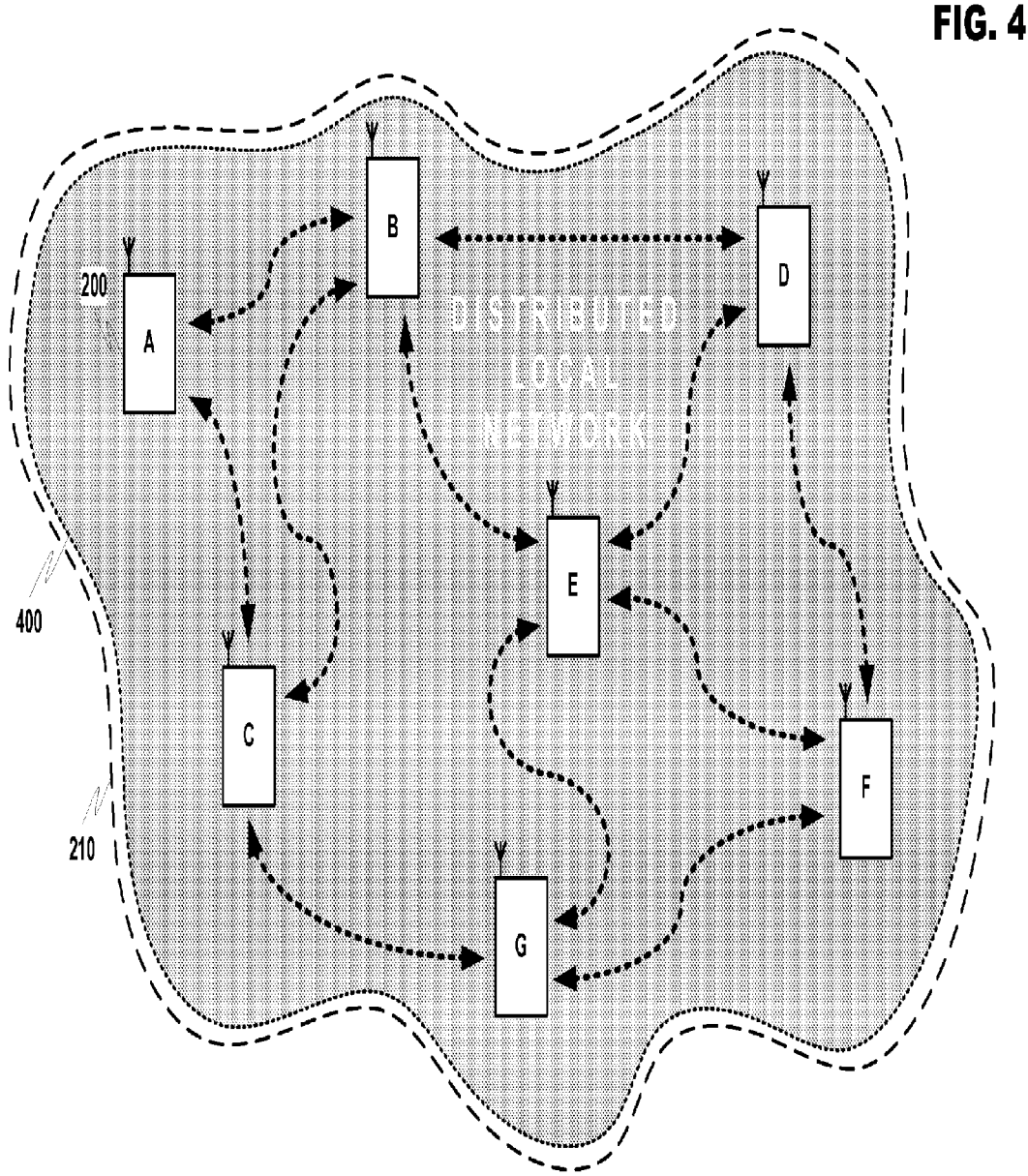
FIG. 4 discloses an example of inter-apparatus message propagation, which may result in distributed local web formation, in accordance with at least one example embodiment of the present invention.

In accordance with at least one embodiment of the present invention, an example of distributed local network formation via automated network establishment and MAC management messages 304 is disclosed in FIG. 4. Apparatuses 200 entering into operational space 210 may immediately initiate network formation through the exchange operational information. Again, the exchange of this information may occur without any prompting from, or even knowledge of, a user. Example interactivity is shown in FIG. 4, wherein various network establishment and MAC management messages 304 are exchanged between apparatuses A to G. In accordance with at least one example embodiment of the present invention, messages may be exchanged directly between an originating apparatus (e.g., the apparatus that is described by information elements contained in a message) and a receiving apparatus. Alternatively, messages corresponding to apparatuses in operational space 210 may be forwarded from one apparatus to another, thereby disseminating the information for multiple apparatuses.

IV. Example Operational Parameter: Diluted Beacon Period

Figure 5:
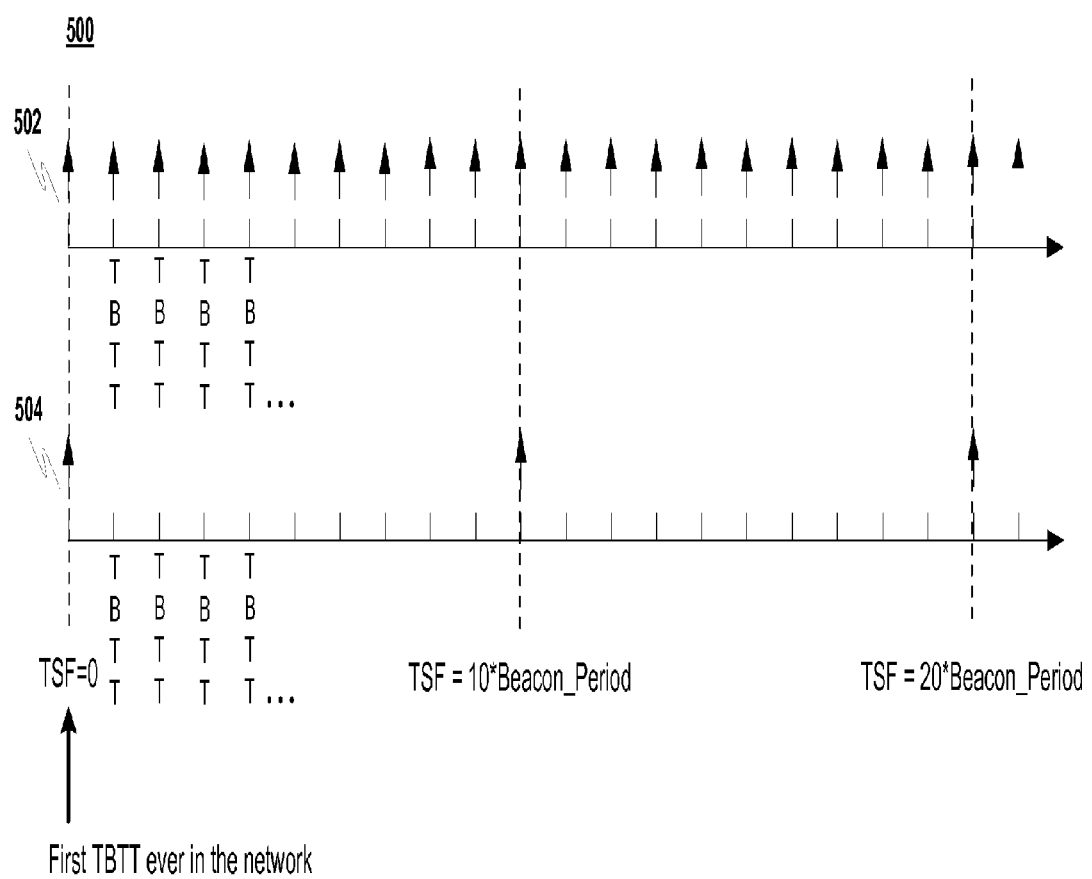
FIG. 5 discloses example beacon implementations that are usable in accordance with at least one example embodiment of the present invention.

An example of information that may be communicated in network establishment and MAC management messages 304 (e.g., using information elements), in accordance with at least one example embodiment of the present invention, is disclosed in FIG. 5. The activity flow disclosed at 500 represents an example implementation based on the wireless local area networking (WLAN) standard, as defined in the IEEE 802.11 specification. However, embodiments of the present invention are not limited only to implementation with WLAN, and thus, may be applied to other wireless network architectures or communication protocols.

The WLAN logical architecture comprises stations (STA), wireless access points (AP), independent basic service sets (IBSS), basic service sets (BSS), distribution systems (DS), and extended service sets (ESS). Some of these components map directly to hardware devices, such as stations and wireless access points. For example wireless access points may function as bridges between stations and a network backbone (e.g., in order to provide network access). An independent basic service set is a wireless network comprising at least two stations. Independent basic service sets are also sometimes referred to as an ad hoc wireless network. Basic service sets are wireless networks comprising a wireless access point supporting one or multiple wireless clients. Basic service sets are also sometimes referred to as infrastructure wireless networks. All stations in a basic service set may interact through the access point. Access points may provide connectivity to wired local area networks and provides bridging functionality when one station initiates communication to another station or with a node in a distribution system (e.g., with a station coupled to another access point that is linked through a wired network backbone).

In wireless network architectures like WLAN, beacon signals may be utilized to synchronize the operation of networked apparatuses. In situations where new ad hoc networks are being created, the initiating apparatus may establish standard network beaconing based on it owns clock, and all apparatuses that join the network may conform to this standard beacon. Similarly, apparatuses that desire to join an existing wireless network may synchronize to the existing beacon. In the case of WLAN, apparatuses may synchronize to beacon signals utilizing a timing synchronization function (TSF). The timing synchronization function is a clock function that is local to an apparatus that synchronizes to and tracks the beacon period.

An example of a beacon signal is shown in FIG. 5 at 502 wherein a target beacon transmission time (TBTT) indicates the targeted beacon transmission. This time may be deemed "targeted" because the actual beacon transmission may be a somewhat delayed from the TBTT due to, for example, the channel being occupied at TBTT. The apparatuses that are active in the network may communicate with each other in accordance with the beacon period (time between two beacon transmissions). However, there may be instances where it may not be beneficial, and may possibly even be detrimental, for apparatuses to be active during each beacon period. For example, apparatuses that do not expect frequent communication within the wireless network may not benefit from being active for every beacon period. Moreover, apparatuses with limited power or processing resource may be forced to waste these precious resources by the requirement of being active for every beacon period.

In accordance with at least one embodiment of the present invention, functionality may be introduced utilizing the example distributed wireless network described above to allow apparatuses to operate at a standard beaconing rate that has been established in the network, or alternatively, using a "diluted" beaconing rate. "Diluted" beaconing may comprise a beaconing mode operating at a lower frequency than the standard beaconing rate originally established in the network. Diluted beaconing may be based on information (e.g., information elements) that is included in network beacon frames, wherein the included information may express one or more diluted beacon rates as multiples of the beacon. Using the beacon and the one or more associated diluted beacon period indications contained within beacon frames, networked apparatuses may elect to operate (e.g., via random contention) based either on the standard beacon or a diluted beacon period. In particular, all apparatuses may synchronize to the same initial target beacon transmission time (TBTT), for example when TSF=0, and may then count the number periods that occur after the initial TBTT based on the internal TSF function. In this way, apparatuses operating using a diluted beacon period may be active on TBTT counts that corresponds to the multiple defined by the diluted beaconing period.

An example diluted beacon interval of every $10^{th}$ TBTT is disclosed in FIG. 5 at 504. The decision on a beacon interval to utilize may be handled by each apparatus individually, (e.g., in the protocol stacks that manage operation of a radio modem). All apparatuses will then, in accordance with at least one embodiment of the present invention, operate based on a beacon interval that remains the same for the lifetime of the network. In view of the requirement that the beacon interval remain unchanged for the duration of the wireless network, the diluted beacon signal may be expressed as a multiple of the beacon signal. Starting intervals may be defined by the apparatus that formed the network, and in the example disclosed in FIG. 5 (and as previously set forth) the first TBTT is equivalent TSF=0. Other apparatuses that subsequently join the network may adopt this beacon interval parameter and TBTT timing. For example, the TBTT at TSF=0 is the "base point" that determines when beacons are transmitted. All the devices in the network may update their own TSF counters as per legacy synchronization rules, and from the TSF they may determine the particular TBTT in which to participate in beaconing assuming that, regardless of the beacon interval, the first beacon was transmitted at TSF=0.

For example, in a network comprising four apparatuses where devices 1, 2 and 4 operate using a diluted beaconing mode having a beacon interval (e.g., a time period between beacon transmissions) of every $6^{th}$ TBTT, all apparatuses may remain synchronized even though only device 3 may be active (e.g., "competing") in all beaconing periods 1, 2, 3, 4 and 5 (e.g., all apparatuses may participate in TBTT 0, TBTT 6, TBTT 12, etc.) Therefore, there can be at least two different beacon periods among the apparatuses, and possibly further diluted beacon periods as other groups of apparatuses may have selected their own diluted beaconing period based on the original beaconing period and the one or more associated diluted beacon period indications transmitted therewith.

In accordance with at least one example embodiment of the present invention, beacons will contain a diluted beacon period parameter. The diluted beacon period parameter may, for example, be carried in vendor-specific information elements (IEs). Diluted beacon period parameter values may remain the same for the lifetime of the network. However, should there be need for more flexibility, other beacon intervals may be defined, and all of the defined beacon intervals may be signaled in a manner similar to the diluted beacon interval.

V. Examples of Awake Windows

Figure 6:
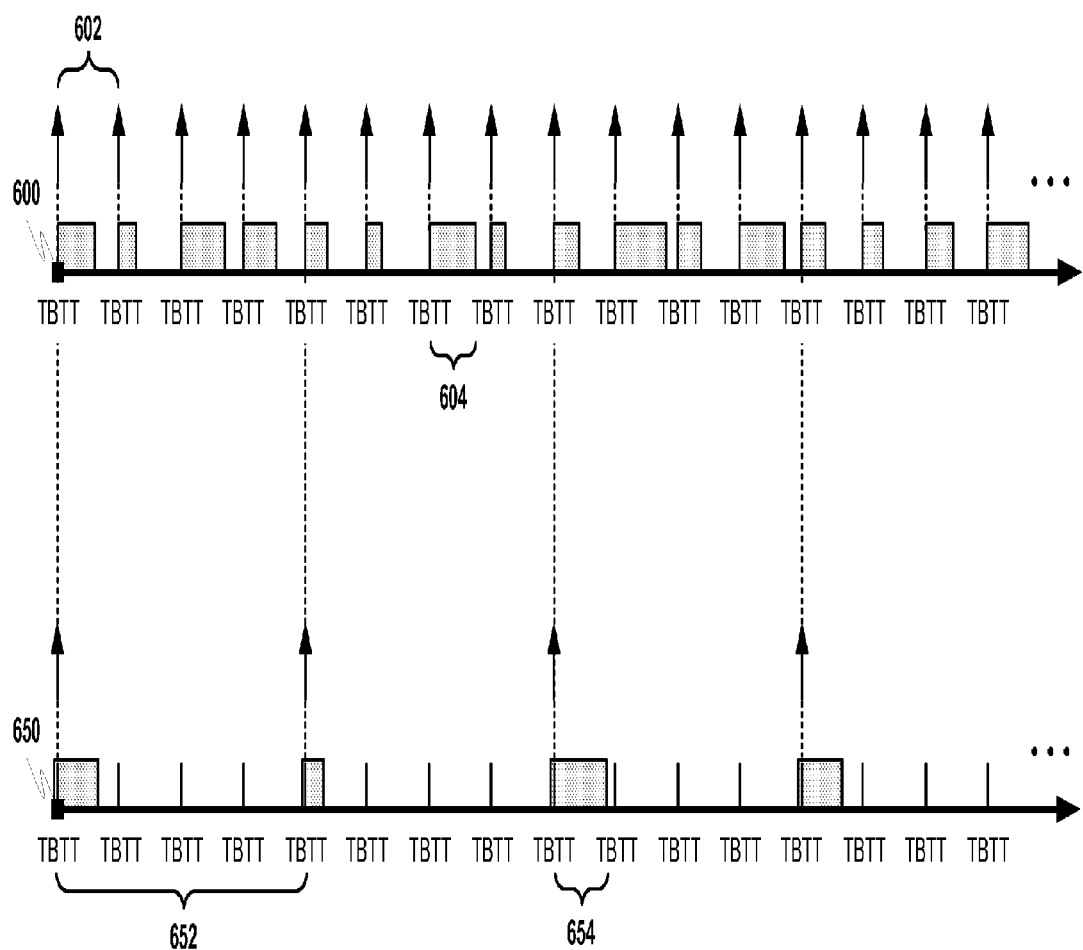
FIG. 6 discloses an example of awake windows in accordance with at least one example embodiment of the present invention.

FIG. 6 discloses an example implementation of "awake windows" in accordance with at least one embodiment of the present invention. Similar to FIG. 5, a "standard" network beacon (e.g., the beacon established by the apparatus that formed the network) is shown at 600. Each target beacon transmit time (TBTT) may represent a beacon frame that is transmitted by an apparatus in the network (or at least times at which beacon transmissions were targeted, barring any delays). Thus, the interval shown at 602 may therefore define the standard beacon period.

Possible awake windows for an apparatus that is participating in the network are further shown in FIG. 6, an example of which is identified at 604. These active periods occur in accordance with each transmitted TBTT, and therefore, may be deemed aligned with the normal network beacon period. These awake windows do not necessarily represent that an apparatus has planned activity (e.g., messages queued for transmission) during these time periods. On the contrary, they are merely periods of time when apparatuses may be active, and therefore, will be able to transmit messages to, and/or receive messages from, other apparatuses in the network.

The behavior of another example apparatus in accordance with at least one embodiment of the present invention is further disclosed at 650. While all apparatuses in the network will operate based on the same origin point (e.g., TSF=0) and normal beacon period (e.g., as set forth by the TBTT), each apparatus may select an operational mode based upon the one or more diluted beacon period indications that are transmitted in the beacon. For example, the apparatus corresponding to the activity disclosed at 650 is operating utilizing diluted beacon period 652, which is a multiple "4" in this scenario. Therefore, diluted beacon period 652 may involve beacon transmissions per every four TBTTs. Awake windows, for example as shown at 654, may also occur in accordance with the diluted beacon period 652. In at least one example implementation, the awake windows may begin just prior to the commencement of the diluted beacon period.

The duration of awake windows, while configured at constant duration by a predetermined information element (IE) in the beacon, may end up being variable in actual practice. For example, the awake window may be based on a MAC parameter that is similar to the beacon interval and diluted beacon period parameters. A host in the beaconing apparatus may determine it and provides it to the modem for transmission in the beacon. It may be communicated using, for example, a general or vendor specific information element (IE) as with the beacon interval and diluted beacon period. Upon awake window expiration apparatuses may attempt to transition to a "doze" or sleep state. However, doze state transitions may occur earlier or later based on the particular control methodology employed, such as that discussed in FIG. 7.

Figure 7:
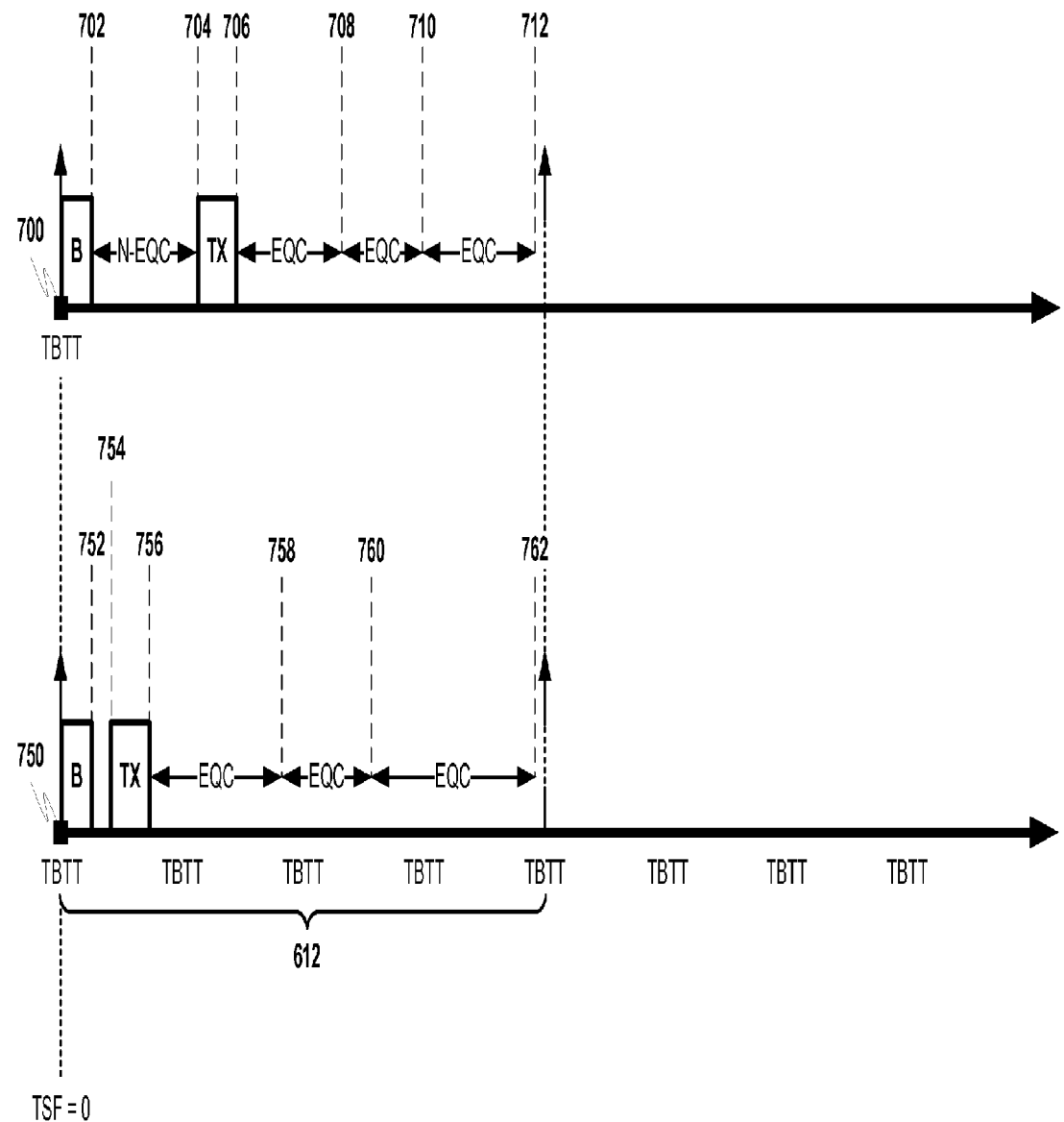
FIG. 7 discloses examples of access control strategies in accordance with at least one example embodiment of the present invention.

FIG. 7 discloses channel access control configurations that may be implemented in accordance with at least one embodiment of the present invention. Initially two channel access states may be defined: a non-empty queue contention (N-EQC) state and an empty queue contention (EQC) state. When apparatuses have no messages (frames) queued for transmission in transmit buffers, the device may be deemed in an EQC state. Alternatively, apparatuses may be deemed in an N-EQC state when there is at least one frame awaiting transmission.

The N-EQC state may comprise optional implementations: "Legacy" 700 and "Beacon Prioritized" 750. Using Legacy implementation 700, upon receiving or transmitting a beacon channel contention may be executed as in legacy devices, for example, as defined by the channel access rules specified in the particular wireless communication medium. Legacy implementation 700 represents an example of channel contention in accordance with an existing set of access control rules between 702 and 704. Once the apparatus gains access to media at 704 it will obtain a transmission opportunity (TXOP) during which it may transmit frames to the network (e.g., if one or more frames are queued for transmission. "TX" as shown between 704 and 706 in FIG. 7 represents the transmission of any queued messages. Further, frames may be received from the network as acknowledgements to the transmitted frames in the "TX" period.

In Beacon Prioritized implementation 750, the apparatus that has transmitted the network beacon is permitted to continue transmitting any frames that are queued for transmission in its transmit buffers. The apparatus obtains a TXOP for beacon transmission, and once it has transmitted the beacon at 752 it may automatically obtain a new TXOP, as shown at 754, to transmit any frames that are pending in its transmit buffers. In the disclosed example the new TXOP may start after a short interframe space (SIFS) period following the end of the beacon frame, which is represented in example 750 by the space shown between 752 and 754.

Once the apparatus has completed transmission (e.g., emptied its transmission buffers), it shall enter into an EQC state as shown in implementations 700 and 750 at 706 and 756, respectively. If an apparatus has no frames for transmission during a beacon interval, the device transition directly into an EQC state after the beacon reception/transmission (e.g., at 702, 752). When in the EQC state apparatuses may try to obtain a TXOP for a given number of times (determined, for example, by a "RepeatEmptyQueueContention" parameter). Upon obtaining a TXOP, apparatuses without pending messages may attempt to obtain a new TXOP as shown at 708/710 and 758/760 in implementations 700 and 750, respectively, instead of initiating the transmission of a frame sequence. Devices that obtain a number of TXOPs that is equal to a predetermined threshold value (e.g., RepeatEmptyQueueContention times) during a beacon interval may enter into doze or sleep state. In example implementations 700 and 750 in FIG. 7 this may occur at 712 and 762, respectively. All of these events may happen before awake window 612 expires. Moreover, example legacy implementation 700 and example beacon prioritized implementation 750 both assume that the message transmissions between 704 and 706, as well as 754 and 756, respectively, succeed, and thus, no frames are pending for (re)transmission beyond this point.

VI. Awareness Information and Data Control

In accordance with at least one embodiment of the present invention, apparatuses may automatically obtain contextual information regarding the local environment via apparatus-to-apparatus communication networks (e.g., via ad hoc networking). As used herein, "awareness information" may comprise information and/or context about a local environment as well as the users and corresponding apparatuses in the local environment. By way of example, awareness information may be used for social networking applications, determining user presence/location, determining contexts associated with an apparatus, advertising, searching for information, etc.

For example, ad hoc networking schemes may build upon an existing wireless protocol, such as the IEEE 802.11 (WLAN) standard. While WLAN has been referenced herein for the sake of explanation, the various embodiments of the present invention are not specifically limited to utilizing WLAN. Continuing with the IEEE 802.11 example, the standard WLAN ad hoc mode may be modified in accordance with the prior disclosure (e.g., so that apparatuses may operate utilizing a diluted beacon period) to allow for always-on operation suitable for a large number of apparatuses while not being overly resource-intensive. As the result, an operational mode for WLAN may be created to allow for easy conveyance of awareness information. It may have some elements of the standard ad hoc mode but it is intended to be an operation of its own. Ad hoc networking that allows for always-on operation, and which may be built upon periodic awake state periods such as disclosed above, may be deemed "awareness networking," and in addition, a similar operational mode for WLAN may be called "awareness operation mode."

An example usage scenario may help clarify how various embodiments of the present invention may be employed in wireless communication. A user may create data (e.g., files) in an apparatus and make this data available for other users. In this regard, the apparatus of the user may have the ability to exchange awareness information and, in accordance with at least one embodiment of the present invention, may utilize this functionality to facilitate the localized sharing of the data by making the operational environment (e.g., apparatuses participating in the network) aware of the shared/published data. In looking for the shared/published data, or while searching for a similar type of data, a user may observe that this data is being offered. A match between shared/published data and desired/required data may initiate an actual transfer of data.

The amount of information exchanged between devices during the publishing and search phases would be minimal, and therefore, may be supported using a less robust operational scheme such as awareness networking implemented, for example, in the form of an awareness operational mode. However, when a transfer involving the shared/published data occurs, it may require substantially more bandwidth than is available in awareness networking. Moreover, as other data transfer protocols may be better suited (e.g., more reliable) for transferring substantial amounts of data, there would be no reason to use lower capacity awareness communication tools for actual data transfers. So, after the initial publishing of data and search phases, the previously discussed operational scheme for sharing awareness information may also be used to configure and initiate actual data transfer utilizing related protocols and transport technologies.

In accordance with at least one embodiment of the present invention, apparatuses may initially exchange small amounts of information pertaining to awareness. In the publishing and search phases this information may be related to identifying published data and matching it with apparatus requirements. If a user finds the published data attractive and decides to examine it, awareness networking operations may be used to exchange information related to setup and configuration of data transfer services and related high bandwidth IP networking technology. So in addition to awareness information, common awake state periods may be used for signaling IP-service setup and configuration information. The actual exchange of service data may then require wireless communication solutions that can provide higher bandwidth than the low duty cycles provided during awake state periods, and a level of reliability (e.g., quality of service—QoS) that can't be provided by the protocols that are used for "awareness information" delivery.

Figure 8:
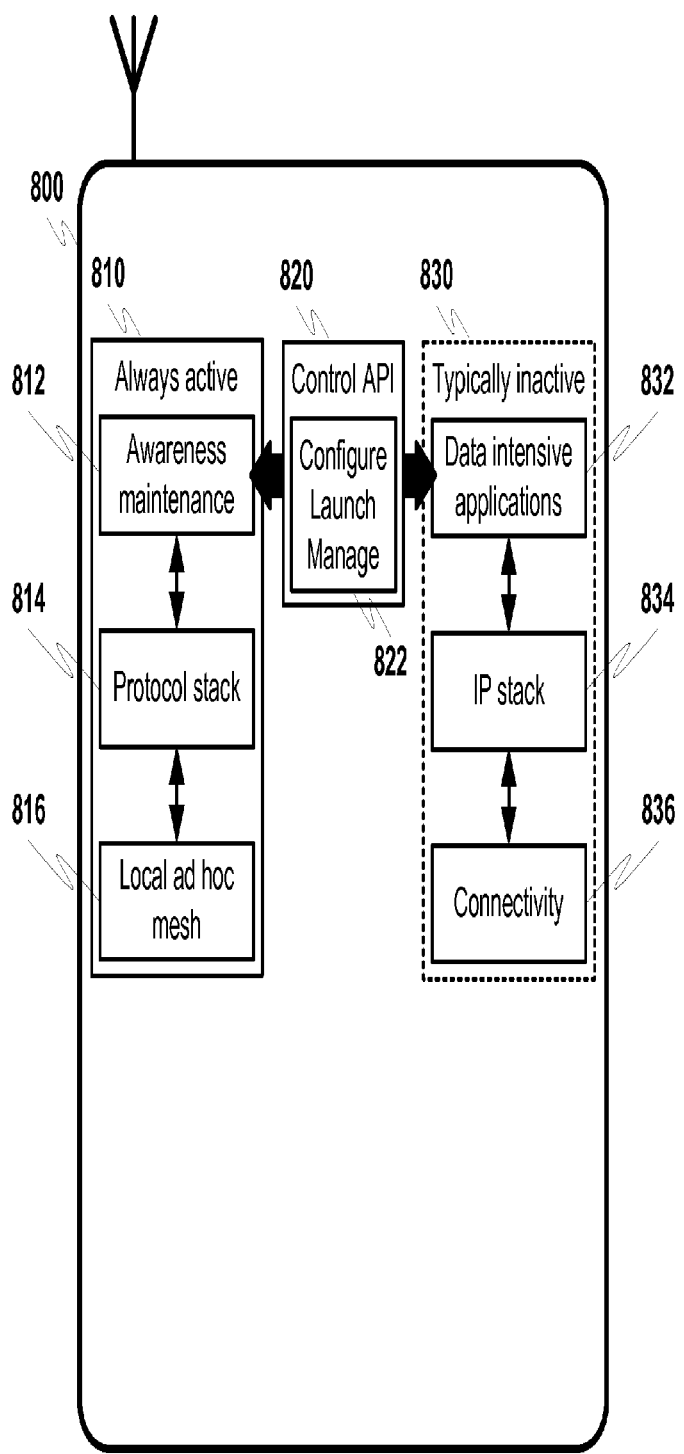
FIG. 8 discloses example awareness-related and data-related apparatus structures in accordance with at least one example embodiment of the present invention.

An example communication structure usable in accordance with various embodiments of the present invention is disclosed in FIG. 8. Apparatus 800 comprises two types of operation. Always active stack 810 may be responsible for providing awareness information over ad hoc mesh networks. Awareness maintenance application 812 may use the services of the protocol stack 814 and local ad hoc mesh network 816. Application 812 may exploit awareness information regarding the local environment via a protocol stack API provided in the apparatus.

Figure 11:
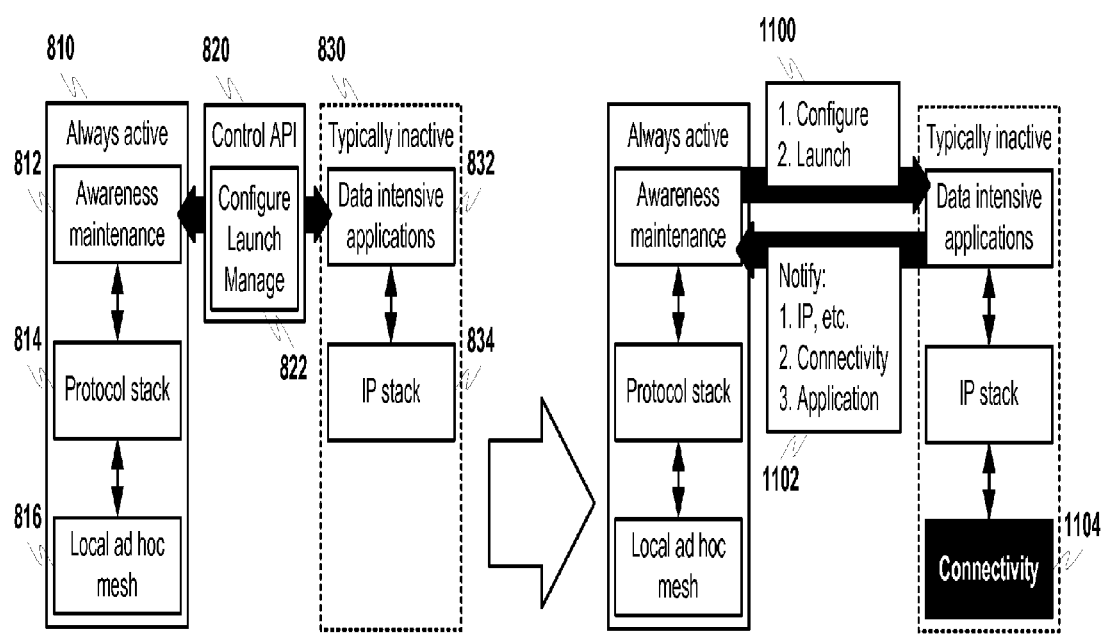
FIG. 11 discloses example data-related task support for protocols that do not comprise data sub-mode operation in accordance with at least one example embodiment of the present invention.

A traditional data centric service/application stack 830 is also disclosed in FIG. 8. It may typically be run over IP and may be a service/application that is inactive most of the time. Data intensive applications 832 may include simple file transmission/downloading applications that utilize IP stack 834 in order to establish connectivity 836 with other apparatuses. Control application program interface (API) 820 between awareness maintenance application 812 and data intensive applications 832 may make the always active services 810 available to typically inactive IP services 830. Control API 820 may be responsible for communication activities that configure, launch and manage operations for typically inactive services 830 as disclosed at 822 in FIG. 11. As an example, always active services 810 may advertise (actively or passively) services on IP side 830. It may also advertise data available in an apparatus, data that can be retrieved from an apparatus by using IP stack 834. Always active services 810 may also provide services for information search so that a determination may be made as to whether there are desired/required resources (e.g., services or data) that are locally available. The underlying stack architecture may also support services and applications configured to support IP networking.

In this framework and context only always active services 810 are active almost all of the time in apparatus 800 while typically inactive services 830 remain idle. Always active services 810 keep on running over a proper low power low duty cycle local ad hoc networking solution (e.g., diluted beacon interval). Traditional services and applications may only activate on an as-needed basis. A criteria for activation may be the need for networking and data transmission using a server-client model. Configuration and activation may be supported by always on services 810 after relevant signaling that occurs between apparatuses in the network.

Figure 9:
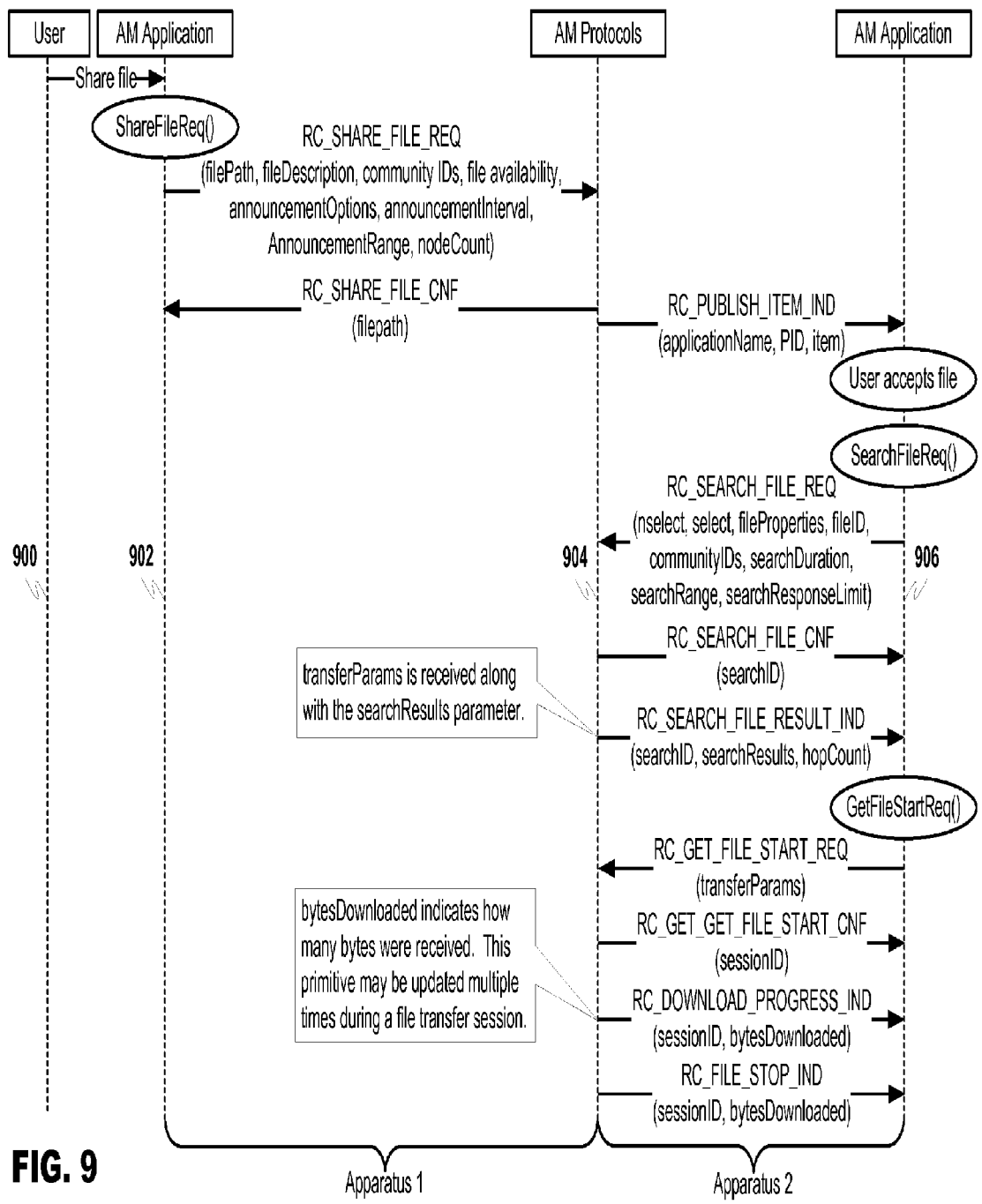
FIG. 9 discloses an example of messaging that may be involved in file sharing and/or publishing in accordance with at least one example embodiment of the present invention.

An example of a process by which information may be published, located and obtained is disclosed in FIG. 9. Initially user 900 may determine that data is to be shared. User 900 utilizes apparatus 1, and may issue a ShareFileReq( ) command to an awareness management (AM) application 902. This command may trigger the issuance of a RCE_SHARE_FILE_REQ message to AM protocol layer 904, which may be confirmed and may then further trigger an indication that the data has been published in the form of RC_PUBLISH_ITEM_IND message to AM application 906 in apparatus 2. A user of apparatus 2 may then review/accept the published data (e.g., file) and then issue a SearchFileRequest( ) command in apparatus 2. This command may then trigger the issuance of a RC_SEARCH_FILE_REQ message from AM application 906 and AM protocols 904 in apparatus 2 to AM protocols 904 in apparatus 1. After receiving confirmation, an RC_SEARCH_FILE_RESULT_IND message, which comprises transferParams in the searchResults field of the message, may be returned to AM application 906 in apparatus 2.

If the user of apparatus 2 decides that the published data is desired/required, a GetFileStartReq( ) command may be issued by AM application 906 in apparatus 2. A RC_GET_FILE_START_REQ may then be transmitted (and confirmed by AM Protocols 904) in order to initiate the download of the desired/required data. Periodic process updates may be provided to apparatus 2 in the form of RC_DOWNLOAD_PROGRESS_IND messages. These progress messages may include the bytesDownloaded primitive which may inform apparatus 2 of the amount of the data download that has been completed. The download may then terminate with a RC_FILE_STOP_IND message.

Figure 10:
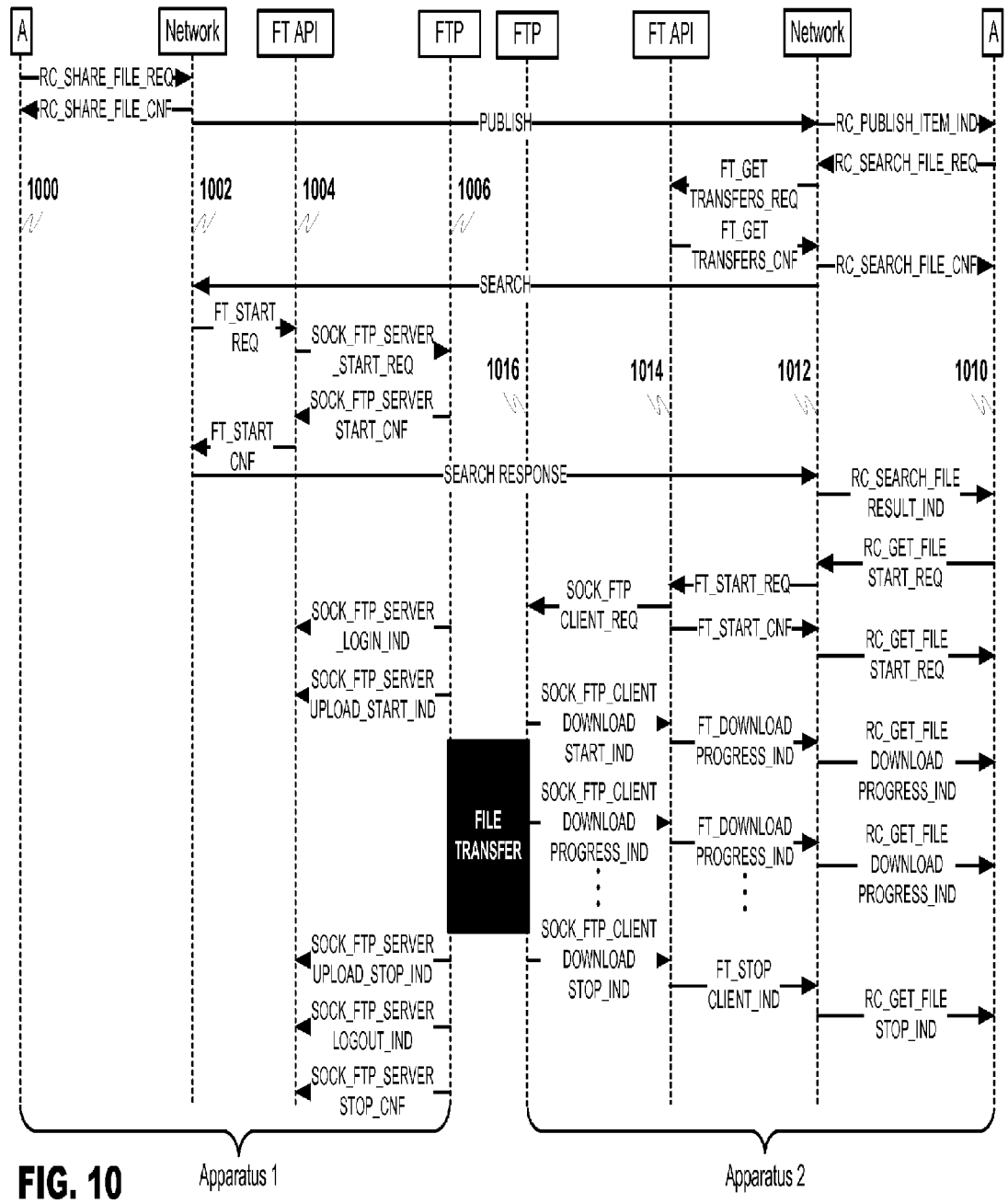
FIG. 10 discloses additional detail regarding the file sharing and/or publishing example of FIG. 9 in accordance with at least one example embodiment of the present invention.

The example of FIG. 9 is explored in further detail with respect to FIG. 10. The disclosed example expands upon the roles of file transfer protocols (FTP) 1006 and 1014 and file transfer application programming interfaces (FT API) 1004 and 1014. This process is similar to FIG. 9 in that an application 1000 first transmits messages via network 1002 to FT API 1004 in order to publish data. Publishing the data causes indication message to be transferred to network 1012 and then application 1010. FT API 1014 may then initiate services in FT API 1004 through a series of commands in order to activate file distribution services in apparatus 1. Eventually file transfer may be conducted between FTP 1006 and 1016. Progress indicators are available during the process in order to update apparatus 2 as to the status of the download. The process may then terminate via a series of commands that terminate services in both apparatus 1 and apparatus 2.

In most instances IP-services are locally accessible to surrounding apparatuses. Thus the most suitable connection technology in many cases may be WLAN ad hoc (or a similar communication technology) with which devices close to each other can directly exchange large amounts of data with IP networking in a peer-to-peer manner. More advanced implementations may also allow data to be exchanged over multiple hops via WLAN ad hoc network technology. For example, a searcher may request access to take a closer look at files provided by a publisher. In practice this would require a traditional server-client relationship between the two apparatuses in order to obtain the file (e.g., to download the file from the publisher apparatus). Additionally, the apparatuses may communicate utilizing an IP protocol for exchanging the data.

In accordance with at least one embodiment of the present invention, operations related to the exchange of awareness information may be used here to convey configuration information between apparatuses. It may also trigger activation of the IP services 830 so that the published data may be conveyed to the requesting apparatus. If, for example, the published file comprises multimedia information (e.g. video and/or audio information), the lower bandwidth awareness network operation may further trigger streaming and media file consumption over the previously configured and activated IP connection. Alternatively, file transfer services may be activated in order to obtain a published file from a publishing apparatus to a searching apparatus.

Streaming and/or downloading may occur utilizing standard protocols such as TCP/IP, UDP, RTP, FTP, etc. An example of such a process is disclosed with respect to FIG. 11. Initially the example shown on the left hand side of the page discloses that IP stack 834 is not actively communicating utilizing any form of connectivity. However, at 1100 control API 1100 may configure and launch connectivity 1104. Typically inactive services may then notify awareness maintenance application 812 of information such as IP information, connectivity information and application related information at 1002. As the result, the two apparatuses may establish IP connectivity for data transfer. After the data has been streamed or transferred there may no longer be a need to keep the transfer-specific resources active. These resources may then be deactivated and always on services 810 may be used for further awareness signaling. Thus, at the end the apparatuses may again be in a situation where only always on services 810 are active.

The above approach in which a separate WLAN ad hoc network is created for supporting service data delivery (e.g., to retrieve shared/published data as in the above example) is straightforward but includes inherent problems. Apparatuses would need to be able to operate both a low bandwidth network and a service data ad hoc network concurrently. Most existing apparatuses/systems do not have the capability to handle multiple concurrent WLAN instances. Moreover, a new ad hoc network may increase signaling overhead, and thus, the probability for radio coexistence problems. As an example, there may be two independent WLAN ad hoc type networks beaconing in parallel: an awareness network (e.g., operating using a diluted beacon period) and a legacy ad hoc network for data transmissions. These two networks may contend for the same media and transmission capacity, even if the apparatuses operate in both networks.

Figure 12:
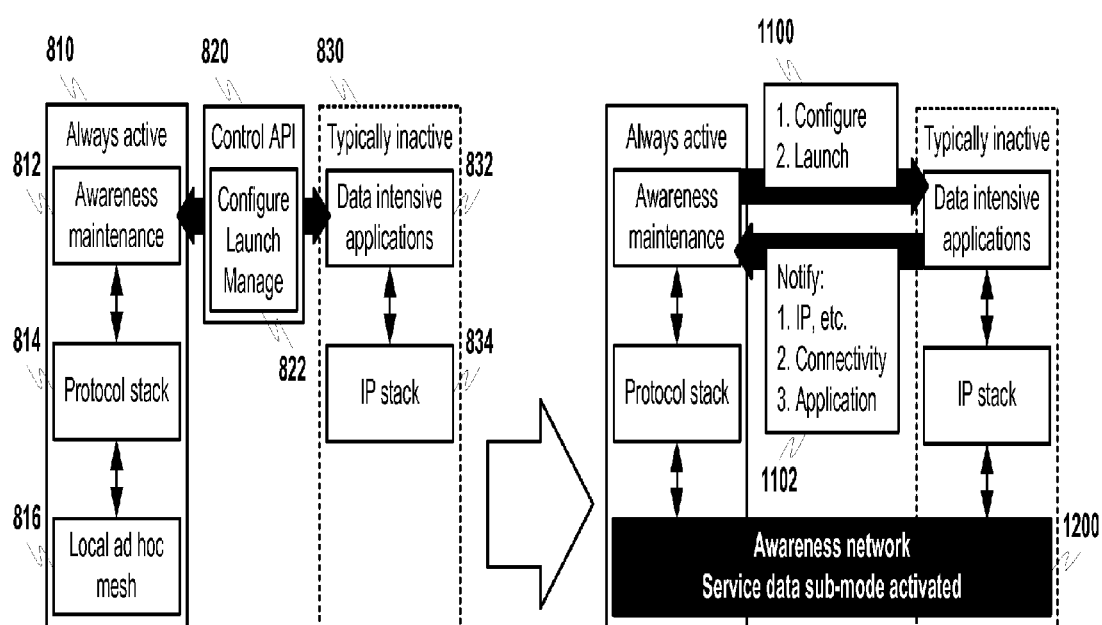
FIG. 12 discloses example data-related task support for protocols that comprise data sub-mode operation in accordance with at least one example embodiment of the present invention.

In accordance with at least one embodiment of the present invention, operating using a service data sub-mode in an awareness network may allow for the transmission of both protocol stack messages and IP datagrams, as well as relevant required protocol messages such as address resolution protocol (ARP) messages. Service data sub-mode may be activated via signaling over protocol stack 814, and once the sub-mode is activated the apparatus can use an awareness network with both diluted beacon interval operation and with normal beacon interval operation also for protocol messages related to the IP based service. An example implementation for an awareness network that is also able to support a data sub-mode is disclosed with respect to FIG. 12. The example is similar to FIG. 11 except that a separate network connection does not have to be established at 1200 since the existing network configuration that is being utilized for conveying awareness information may also support the conveyance of data utilizing a data sub-mode in the awareness network.

All apparatuses that are involved in service data delivery may operate using this sub-mode and may determine their power state in accordance with sub-mode related transition rules. Consequently, apparatuses would not need to establish a separate WLAN ad hoc network for service data delivery, but instead they use the awareness network for service data delivery as well. There are four aspects in the service data sub-mode usage including media access rules, sub-mode activation signaling, sub-mode use and sub-mode closure signaling. There may be separate time periods corresponding to awareness maintenance messages and data-related messages. For example, data-related messages (e.g., IP datagrams, configuration protocol messages like ARP and all the required protocol messages that run over IP such as FTP and RTP) may occur during dedicated periods of time that immediately follow awake state periods.

Figure 13:
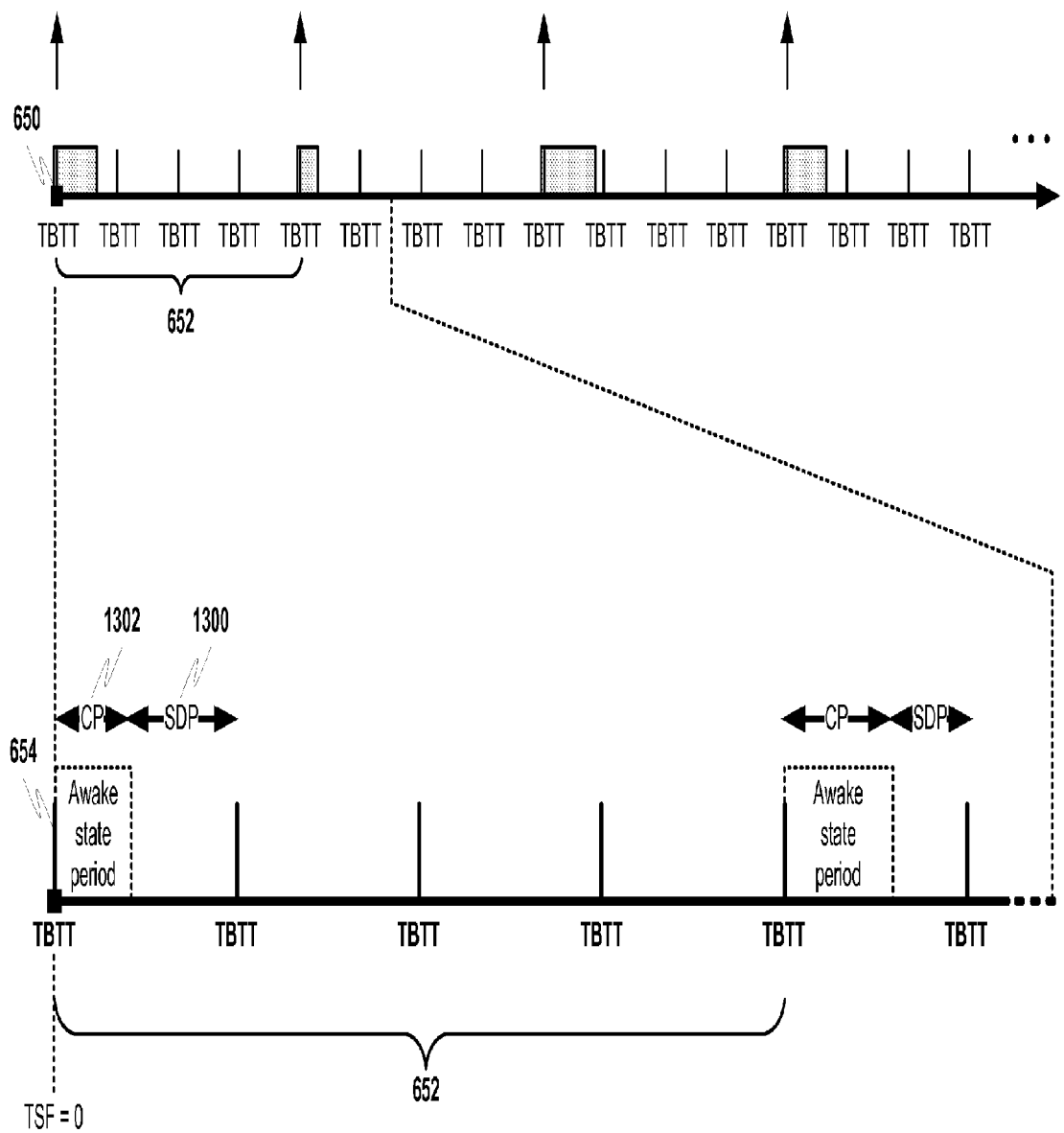
FIG. 13 discloses an example activity flow for apparatuses supporting awareness and data in accordance with at least one example embodiment of the present invention.

In accordance with the example disclosed in FIG. 13, all service data messages may be transmitted during time periods 1300 that follow the awake state periods 654. As a result, there may be dedicated time periods for awareness maintenance signaling and IP based service messages. Consequently, an apparatus that supports a service data sub-mode active may use a part of each beacon interval during which the apparatus is awake for beaconing for high bandwidth service data transmissions. We can rename these periods "service data periods" (SDP) 1300 and the awake state periods as "control periods" (CP) 1302 as illustrated in FIG. 13. While FIG. 13 discloses an example of a diluted beacon interval activity, data sub-mode operation may be utilized in both diluted beacon operation schemes and in standard network operation (e.g., where an apparatus can be active during every TBTT). Each apparatus that employs a service data sub-mode may deem service data period 1300 active immediately after closing control period 1302. Service data periods 1300 may then close at the next TBTT. Apparatuses need to ensure that all the service data packets are transmitted during the service data periods. If an apparatus operates per diluted beaconing rules, the rules for service data period opening and closure may remain the same. However, since apparatuses are not active at every TBTT, service data periods 1300 occur only in beacon periods where the apparatus is awake for beaconing as per the beaconing rules.

Apparatuses may need to separate "awareness information" packets from service data packets (typical IP packets). For example, the WLAN MAC layer may utilize both types of data frames. In practice an apparatus needs to have separate (logical or physical) transmission queues for the two packet types to maintain the separation in time. All "awareness information" packets need to be transmitted during control periods 1302 and all service data packets need to be transmitted during service data period 1300. In reception the WLAN MAC doesn't have to make separation between the two packet types. A possible solution may be to use the Protocol ID field in the link layer control (LLC) sub-network access protocol (SNAP) packet header and reserve a value for "awareness information." WLAN already uses this field, and various other networking protocols (e.g., IPv4 and IPv6) may be identified utilizing specific values of the field.

Figure 14:
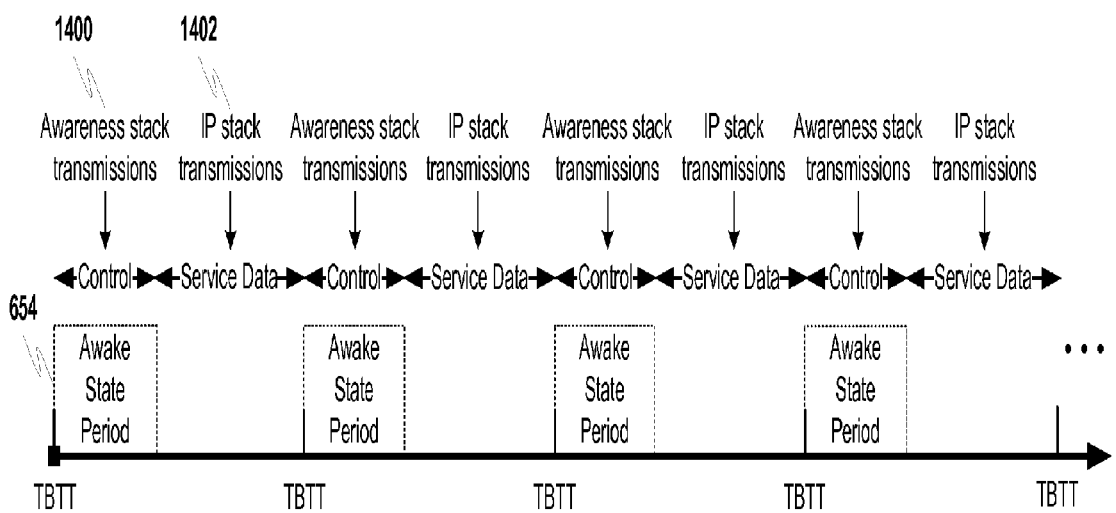
FIG. 14 discloses transmission type detail regarding the example activity flow of FIG. 13 in accordance with at least one example embodiment of the present invention.

In accordance with at least one embodiment of the present invention, renaming the awake state period may have no effect on the rules that may apply to operations occurring during that period, which is further disclosed in FIG. 14. As opposed to FIG. 13 which discloses an example of diluted beacon interval operation, FIG. 14 discloses an example where "standard" network operation allows an apparatus to be active for every beacon interval. All small packets related to "awareness information" and service setup and configuration may still be transmitted during control period 1302. This is labeled in FIG. 14 as awareness stack transmission 1400. No IP messages or other traditional networking protocol packets are transmitted during that period, but they may be transmitted during the subsequent service data periods 1300. Therefore only IP stack transmissions 1402 may occur during service data periods 1300. The only difference for scenarios where the service data sub-mode is not in use is the time when the apparatus transitions into a doze state. When a service data sub-mode is active, apparatuses may remain in the awake state for the duration of service data period 1300 to make subsequent service data transmissions.

Apparatuses signal using protocol stack 812 as to whether they have service data sub-mode capability, whether they are able to start using the service data sub-mode and the time it will take for IP service frame transmission, when needed. Sub-mode activation timing can be either TSF based (e.g., signaled to start at certain TBTT) or implicit from the activation signaling phase. Before all this the apparatuses may have already signaled IP configuration information, IP service protocol, IP service application configuration and activation information using protocol stack 814. Data sub-mode typically needs to be activated before protocol messages related to the IP can be transmitted during service data periods of an awareness network.

Details of the activation signaling may, however, depend on the type of IP based service. If a service is a point-to-point service in which data is transmitted in a unicast manner it may be more natural to utilize unicast point-to-point signaling in order to ensure that a service data sub-mode has been activated in both apparatuses. If the transmission is implemented in multi-hop manner using multiple wireless links, a data sub-mode must also be activated in all of the intermediate devices along the path from the source device to the destination. There are, however, some services like multimedia (e.g., video and/or audio) streaming that are more effectively handled using groupcast transmission. In this instance receiving apparatuses should be allowed to activate a data sub-mode at times when a user wants to start consuming the stream (e.g., activation timing and related signaling has no critical timing requirements). It would be enough for the streaming apparatus to make the other apparatuses in the network aware of the service and use of the service data sub-mode for service transmission. Apparatuses that want to receive the stream may then activate a data sub-mode at any time while the streaming is active.

Figure 15:
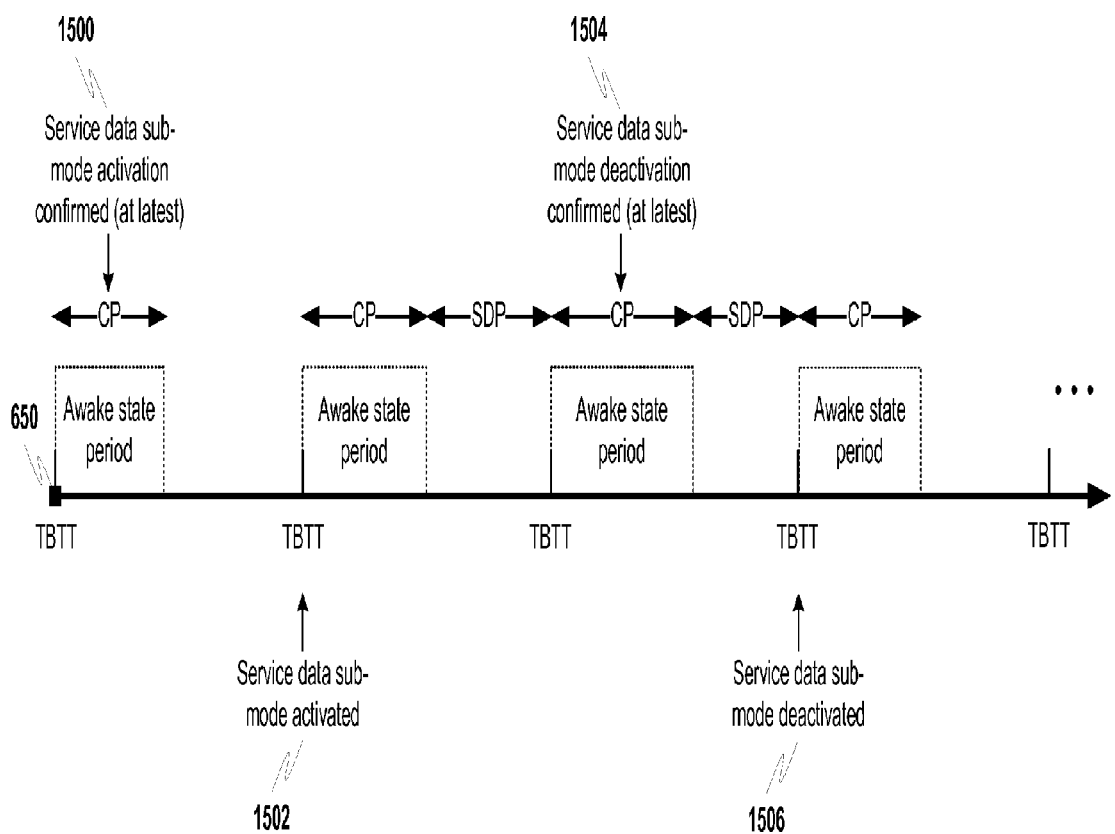
FIG. 15 discloses data sub-mode start/stop detail regarding the example activity flow of FIG. 13 in accordance with at least one example embodiment of the present invention.

As disclosed in the Example of FIG. 15, after service data sub-mode activation is confirmed at 1500, activation time (second TBTT from the left) can be signaled either as a TSF value in a message before the given TBTT or the activation protocol rules may have timing rules for controlling the activation (e.g., a data sub-mode is activated on the next TBTT following the activation confirmation message as shown at 1502). When the sub-mode is active all messages from IP stack 834 will be transmitted during the service data period. Service data sub-mode closure may be signaled in a manner similar to the activation as shown at 1504. Closure time can be indicated either as a TBTT or it may be implicit from the signaling phases (e.g., a TBTT following a specific closure signaling message as shown at 1506). Implication of IP service type may also be similar to the activation signaling. As an example, a stream receiver can deactivate the sub-mode at any time as long as the device is not along a multi-hop path of the service, but in point-to-point services deactivation must not happen before all IP service related transmissions are complete. Thus the source of the service may determine the time when the service closes and the service data-sub mode is deactivated.

Figure 16:
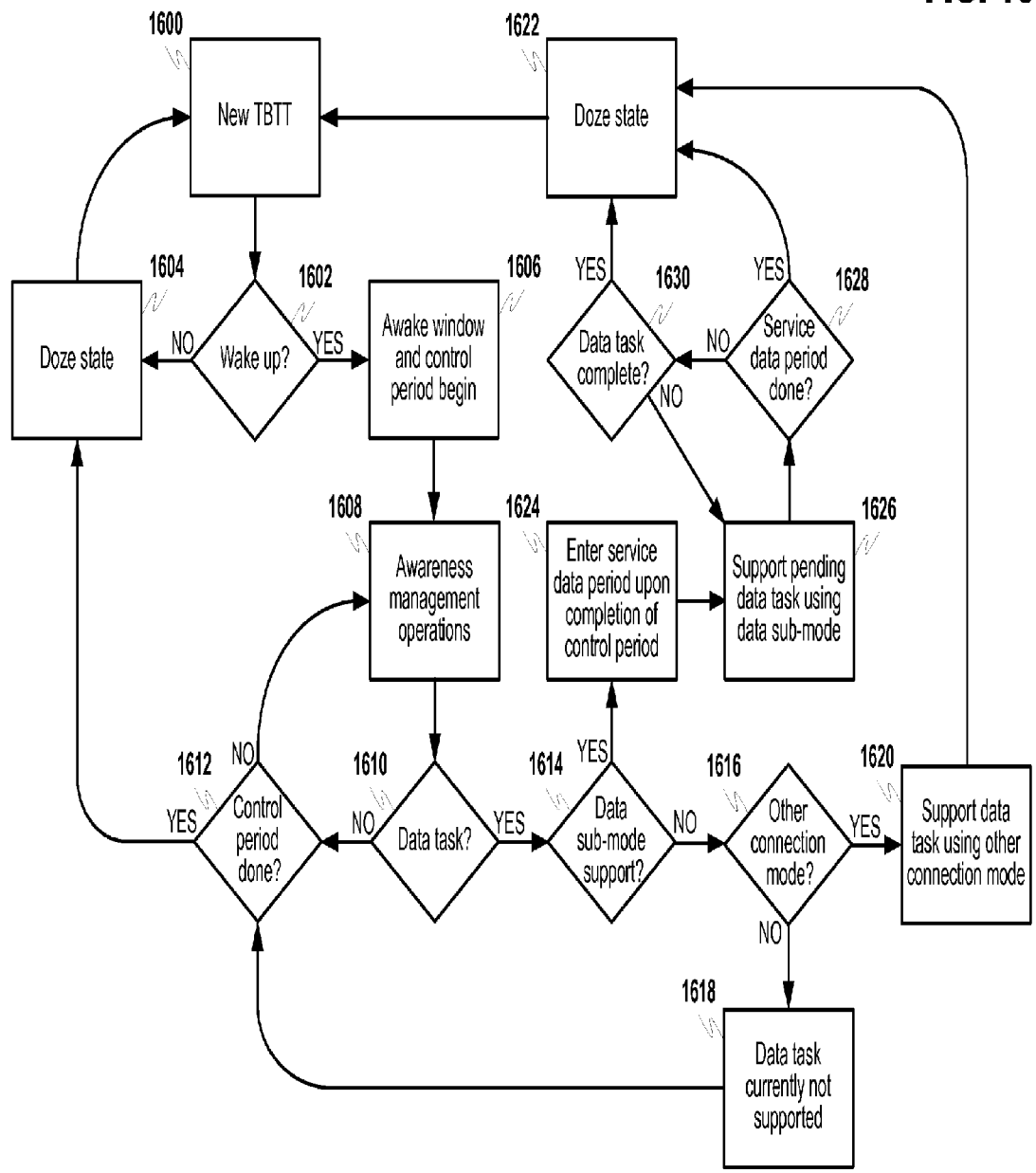
FIG. 16 discloses a flowchart for an example communication control process in accordance with at least one example embodiment of the present invention.

A flowchart of an example process in accordance with at least one embodiment of the present invention is disclosed with respect to FIG. 16. A new TBTT may be realized in step 1600. The TBTT may be realized as a periodic network beacon signal received in an apparatus. A determination may then be made in step 1602 as to whether the apparatus should wake up. For example, apparatuses operating using standard beaconing may wake up for every new TBTT, while apparatuses that are participating using diluted beaconing may determine whether the current TBTT corresponds to the diluted beacon interval that the apparatus is utilizing for interacting with the network. If the current TBTT does not trigger the apparatus to wake up, then in step 1604 the apparatus may remain in a doze state and then return to step 1600 in preparation for the next TBTT. If the current TBTT does cause the apparatus to wake up, as determined in step 1602, then an awake window for the apparatus, and a control period within the awake window, may begin in step 1606. Awareness management operations in step 1608 may be performed during the control period that began in step 1606. Awareness management operations may comprise, for example, interacting with other apparatuses in the network in order to obtain apparatus identity information, apparatus condition information, communication configuration information, available service information and/or pending data task information, etc.

In step 1610 the awareness information obtained in step 1608 may be evaluated in order to determine whether any data-related tasks are pending. Data related tasks may comprise publishing data from the apparatus and/or obtaining data published by another apparatus. If in step 1610 no data tasks are pending the process may proceed to step 1612 where a determination may be made as to whether control period for the current awake window is now complete. If the current control period is not complete, the process may return to step 1608 for further awareness information-related operations (e.g., obtaining updated awareness information). If the control period is complete the apparatus may reenter a doze state in step 1604 and return to step 1600 in order to prepare for the next TBTT. If data tasks are determined to be pending in step 1610, then the process may proceed to step 1614 where a further determination may be made as to whether a data sub-mode is supported by the communication protocol currently being employed. If no data sub-mode is determined to be available, then in step 1616 a further determination may be made as to whether another connection mode is available for supporting the pending data task. Other connection modes may include existing or new modes of communication using the same wireless transport, or another wireless transport, that may be more appropriate for supporting the data tasks. If no other connection mode is available, then in step 1618 the pending data task may not currently be supported (e.g., the task cannot currently be completed). The process may then return to step 1612 in order to determine if the control period is complete. If another connection mode is determined to be available, then the data-related task may be performed using the other connection in step 1620. After the data-related task is complete in step 1620, the apparatus may enter the doze state in step 1622 and return to step 1600 in preparation for the next TBTT.

Alternatively, if in step 1614 a determination is made that a data sub-mode is available, then the process may move to step 1624 where the apparatus may enter a service data period after the control period is complete. The data-related tasks may then be supported using the data sub-mode in step 1626. Processing of the data-related task continue in step 1626 until the service data period is complete in step 1628, or if the service data period is determined to be still active, if the data-related task is complete in step 1630. Regardless of whether the service data window is done in step 1628 or the data task is complete in step 1630, the apparatus may then enter a doze state in step 1622 and return to step 1600 in preparation for the next TBTT.

Further to the above, the various example embodiments of the present invention are not strictly limited to the above implementations, and thus, other configurations are possible.

For example, apparatuses in accordance with at least one embodiment of the present invention may comprise means for maintaining awareness information in an apparatus by interacting with other apparatuses in a wireless network for at least a portion of an interval between network beacon signals during which the apparatus is permitted to communicate in the wireless network, means for determining whether any data-related tasks are pending in the network by evaluating the awareness information in the apparatus, and means for, if data-related tasks are determined to be pending, supporting the pending data-related tasks by altering apparatus configuration.

At least one other example embodiment of the present invention may include electronic signals that cause apparatuses to maintain awareness information by interacting with other apparatuses in a wireless network for at least a portion of an interval between network beacon signals during which the apparatus is permitted to communicate in the wireless network, determining whether any data-related tasks are pending in the network by evaluating the awareness information in the apparatus, and if data-related tasks are determined to be pending, supporting the pending data-related tasks by altering apparatus configuration.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   interacting, by an apparatus, with other apparatuses in a wireless network to communicate at least awareness information within the wireless network,
   wherein the awareness information comprises at least one of information regarding an availability of published data from the apparatus to other apparatuses in the wireless network and information regarding data searched for within the wireless network by the apparatus;
   determining whether any data-related tasks relating to the apparatus are pending in the network by evaluating the awareness information in the apparatus,
   wherein the data-related tasks comprise at least one of providing published data, that has been identified as available, from the apparatus to at least one of the other apparatuses in the wireless network and obtaining published data, that has been identified as available, from at least one of the other apparatuses in the wireless network that substantially matches the data searched for within the wireless network by the apparatus; and
   if at least one data-related task relating to the apparatus is determined to be pending, interacting with at least one other apparatus within the network between network beacon signals during which the apparatus is permitted to communicate service data information within the wireless network.

2. The method of claim 1, further comprising updating synchronization information in the apparatus.

3. The method of claim 1, wherein determining if any data-related tasks are pending comprises at least one of determining if data requested by the apparatus is available from another apparatus or if data has been requested from the apparatus by another apparatus.

4. The method of claim 1, further comprising entering a doze state in the apparatus if no data-related tasks are determined to be pending.

5. The method of claim 1, wherein the apparatus supports the data-related task by interacting with the at least one other apparatus within the network between network beacon signals until the at least one data-related task is complete or another network beacon signal is received in the apparatus.

6. The method of claim 5, wherein the apparatus remains in an active state in the network for any time left in a remaining portion between network beacon signals after the data-related task is complete.

7. The method of claim 1, further comprising causing the apparatus to establish a new connection utilizing a different wireless protocol to support data-related tasks.

8. The method of claim 1, wherein the interacting with other apparatuses in the wireless network to communicate at least awareness information within the wireless network is performed during a control period portion of a periodic time interval between network beacon signals, the control period portion following the network beacon signals.

9. The method of claim 8, wherein the interacting with at least one other apparatus within the network between network beacon signals during which the apparatus is permitted to communicate service data information within the wireless network is performed for some or all of a service data period portion of the periodic time interval between network beacon signals, the server data period portion following completion of the control period portion.

10. The method of claim 1, wherein the service data information is communicated to perform the at least one data-related task.

11. A computer program product comprising computer executable program code recorded on a non-transitory computer readable storage medium, the computer executable program code comprising:
    code configured to cause an apparatus to interact with other apparatuses in a wireless network to communicate at least awareness information within the wireless network,
    wherein the awareness information comprises at least one of information regarding an availability of published data from the apparatus to other apparatuses in the wireless network and information regarding data searched for within the wireless network by the apparatus;
    code configured to cause an apparatus to determine whether any data-related tasks relating to the apparatus are pending in the network by evaluating the awareness information in the apparatus,
    wherein the data-related tasks comprise at least one of providing published data, that has been identified as available, from the apparatus to at least one of the other apparatuses in the wireless network and obtaining published data, that has been identified as available, from at least one of the other apparatuses in the wireless network that substantially matches the data searched for within the wireless network by the apparatus; and
    code configured to cause an apparatus to, if at least one data-related task relating to the apparatus is determined to be pending, interact with at least one other apparatus within the network between network beacon signals during which the apparatus is permitted to communicate service data information within the wireless network.

12. The computer program product of claim 11, further comprising code configured to cause the apparatus to update synchronization information in the apparatus.

13. The computer program product of claim 11, wherein code configured to cause an apparatus to determine if any data-related tasks are pending comprises at least one of code configured to cause an apparatus to determine if data requested by the apparatus is available from another apparatus or code configured to cause an apparatus to determine if data has been requested from the apparatus by another apparatus.

14. The computer program product of claim 11, further comprising code configured to cause an apparatus to enter a doze state in the apparatus if no data-related tasks are determined to be pending.

15. The computer program product of claim 11, wherein the apparatus supports the data-related task by interacting with the at least one other apparatus within the network between network beacon signals until the data-related task is complete or another network beacon signal is received in the apparatus.

16. The computer program product of claim 15, wherein the apparatus remains in an active state in the network for any time left in a remaining portion between network beacon signals after the at least one data-related task is complete.

17. The computer program product of claim 11, further comprising code configured to cause the apparatus to establish a new connection utilizing a different wireless protocol to support data-related tasks.

18. The computer program product of claim 11, wherein the interacting with other apparatuses in the wireless network to communicate at least awareness information within the wireless network is performed during a control period portion of a periodic time interval between network beacon signals, the control period portion following the network beacon signals.

19. The computer program product of claim 18, wherein the interacting with at least one other apparatus within the network between network beacon signals during which the apparatus is permitted to communicate service data information within the wireless network is performed for some or all of a service data period portion of the periodic time interval between network beacon signals, the service data period portion following completion of the control period portion.

20. The computer program product of claim 11, wherein the service data information is communicated to perform the at least one data-related task.

21. An apparatus, comprising:
    at least one processor; and
    at least one memory including executable instructions, the at least one memory and the executable instructions being configured to, in cooperation with the at least one processor, cause the apparatus to perform at least the following:
    interact with other apparatuses in a wireless network to communicate at least awareness information within the wireless network,
    wherein the awareness information comprises at least one of information regarding an availability of published data from the apparatus to other apparatuses in the wireless network and information regarding data searched for within the wireless network by the apparatus;
    determine whether any data-related tasks relating to the apparatus are pending in the network by evaluating the awareness information in the apparatus,
    wherein the data-related tasks comprise at least one of providing published data, that has been identified as available, from the apparatus to at least one of the other apparatuses in the wireless network and obtaining published data, that has been identified as available, from at least one of the other apparatuses in the wireless network that substantially matches the data searched for within the wireless network by the apparatus; and
    if at least one data-related task relating to the apparatus is determined to be pending, interact with at least one other apparatus within the network between network beacon signals during which the apparatus is permitted to communicate service data information within the wireless network.

22. The apparatus of claim 21, further comprising the at least one memory and the executable instructions being configured to, in cooperation with the at least one processor, cause the apparatus to update synchronization information in the apparatus.

23. The apparatus of claim 21, wherein determining if any data-related tasks are pending comprises at least one of determining if data requested by the apparatus is available from another apparatus or if data has been requested from the apparatus by another apparatus.

24. The apparatus of claim 21, further comprising the at least one memory and the executable instructions being configured to, in cooperation with the at least one processor, cause the apparatus to enter a doze state in the apparatus if no data-related tasks are determined to be pending.

25. The apparatus of claim 21, wherein the apparatus supports the data-related task by interacting with the at least one other apparatus within the network between network beacon signals until the at least one data-related task is complete or another network beacon signal is received in the apparatus.

26. The apparatus of claim 25, wherein the apparatus remains in an active state in the network for any time left in a remaining portion between network beacon signals after the data-related task is complete.

27. The apparatus of claim 21, further comprising the at least one memory and the executable instructions being configured to, in cooperation with the at least one processor, cause the apparatus to establish a new connection utilizing a different wireless protocol to support data-related tasks.

28. The apparatus of claim 21, wherein the interacting with other apparatuses in the wireless network to communicate at least awareness information within the wireless network is performed during a control period portion of a periodic time interval between network beacon signals, the control period portion following the network beacon signals.

29. The apparatus of claim 28, wherein the interacting with at least one other apparatus within the network between network beacon signals during which the apparatus is permitted to communicate service data information within the wireless network is performed for some or all of a service data period portion of the periodic time interval between network beacon signals, the server data period portion following completion of the control period portion.

30. The apparatus of claim 21, wherein the service data information is communicated to perform the at least one data-related task.

* * * * *